(12) United States Patent
Ehrlich

(10) Patent No.: US 7,088,546 B2
(45) Date of Patent: Aug. 8, 2006

(54) METHOD TO REJECT DISK DRIVE DISTURBANCE

(75) Inventor: Richard M. Ehrlich, Saratoga, CA (US)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/862,045

(22) Filed: Jun. 4, 2004

(65) Prior Publication Data

US 2004/0257692 A1 Dec. 23, 2004

Related U.S. Application Data

(60) Provisional application No. 60/532,452, filed on Dec. 24, 2003, provisional application No. 60/476,634, filed on Jun. 5, 2003.

(51) Int. Cl.
*G11B 5/596* (2006.01)
(52) U.S. Cl. .................. 360/77.02; 360/77.03
(58) Field of Classification Search ............. 360/77.02
See application file for complete search history.

(56) References Cited

U.S. PATENT DOCUMENTS

| | | | |
|---|---|---|---|
| 5,491,394 A | 2/1996 | Harwood et al. | 318/563 |
| 5,654,840 A | 8/1997 | Patton et al. | 360/75 |
| 5,663,847 A | 9/1997 | Abramovitch | 360/77.02 |
| 5,768,045 A | 6/1998 | Patton, III et al. | 360/78.04 |
| 5,844,743 A | 12/1998 | Funches | 360/78.04 |
| 6,097,564 A | 8/2000 | Hunter | 360/78.04 |
| 6,285,522 B1 | 9/2001 | McKenzie et al. | 360/77.05 |
| 6,304,406 B1 | 10/2001 | Douglas et al. | 360/73.03 |
| 6,359,748 B1 | 3/2002 | Goker | 360/78.02 |
| 6,414,813 B1 | 7/2002 | Cvancara | 360/77.02 |
| 6,493,169 B1 | 12/2002 | Ferris et al. | 360/73.03 |

*Primary Examiner*—Wayne Young
*Assistant Examiner*—Jason Olson
(74) *Attorney, Agent, or Firm*—Fliesler Meyer LLP

(57) ABSTRACT

Track mis-registration (TMR) correction is conditionally made in a hard disk drive using servo data in a closed loop servo control scheme, along with one or more alternative sensing schemes when an external shock or vibration occurs. The alternative sensing schemes include measurement of spindle motor speed using a frequency of servo markers read from a rotating disk, voice control motor (VCM) back emf, spindle motor speed back emf, and accelerometer readings. The predicted TMR resulting from the signal generated by the alternative sensing scheme(s) is simulated based upon a model of the disk drive system, and corrections are applied only if the expected TMR due to the disturbances is large enough that application of the corrections using the alternative sensing scheme would be likely to reduce the overall TMR. In one case, actual operation is occasionally performed with and without corrective TMR feedback from the selected sensing scheme(s), and the actual values are compared with predictions from the system model and the results are used to update the system model.

13 Claims, 10 Drawing Sheets

METHOD TO REJECT DISK DRIVE DISTURBANCE

PRIORITY CLAIM TO PROVISIONAL APPLICATION

This Patent Application claims priority to U.S. Provisional Patent Application No. 60/476,634, filed Jun. 5, 2003, and to U.S. Provisional Patent Application No. 60/532,452, filed Dec. 24, 2003.

BACKGROUND

1. Technical Field

The present invention relates to servo control to reduce track mis-registration (TMR). More specifically, the present invention applies to enhanced disturbance rejection when a shock or vibration occurs to correct for effects of that disturbance.

2. Related Art

A hard disk drive typically includes one or more rotatable storage media, or disks upon which data is encoded. The disks are mounted on the shaft of a spindle motor for rotation. Data is encoded on the rotating disks as bits of information using magnetic field reversals grouped in tracks. A transducer head supported by an actuator arm is used to read data from or write data to the disks.

A voice control motor (VCM) attached to the actuator arm controls positioning of the actuator, and thus the transducer head position over a disk. Current is applied to the coil of the VCM to control the position of the actuator. Movement of the actuator caused by current applied to the VCM, or by an external shock, generates a back emf voltage in the coil of the VCM motor. Measurements of back emf from the VCM coil are typically made to determine the velocity of the actuator during start-up, or until track positioning information can be read from the disk through the transducer head to determine actuator position.

The transducer head includes a slider having an air bearing surface that causes the transducer to fly above the data tracks of the disk surface due to fluid currents caused by the spindle motor rotating the disk. Thus, the transducer does not physically contact the disk surface during normal operation of the disk drive to minimize wear on both the head and disk surface.

Typically during shut down, the actuator is positioned on a ramp situated off to the side of a disk. For some disk drives, the ramp may be at or near the inner diameter of the disk. Before power is actually shut off, the actuator assembly is moved up the ramp to a park position at the top of the ramp to prevent the slider from contacting the disk.

Startup includes moving the actuator down the ramp so that the slider of the transducer flies when it gets to the bottom of the ramp. To assure the slider does not come into contact with the disk, the velocity of the actuator coming down the ramp is carefully monitored and controlled. Since servo data cannot be read using the transducer head, back emf voltage across the VCM coil is measured to monitor actuator velocity since back emf varies as a function of the velocity of the actuator sliding down the ramp.

Once the slider forms an air-bearing over the disk, the head can typically read from the disk. Servo position data read from the disk is processed by the processor, enabling the processor to provide servo control signals to control the VCM for proper positioning of a transducer head relative to a disk. With servo position data available for determining actuator position, back emf voltage readings in previous systems in most disk drive systems are no longer used to determine the position and/or velocity of the actuator.

Control of the position of the head over tracks on the disk is typically achieved with the closed loop servo system where head position servo information is provided from the disk to detect and control the position of the heads. As will be recognized, a dedicated servo system entails the dedication of one entire surface of one of multiple disks to servo information, with the remaining disc surfaces being used for the storage of user data. Alternatively, an embedded servo system involves interleaving the servo information with the user data on each of the surfaces of the discs so that both servo information and user data is read by each of the heads. Hybrid systems also exist, in which one entire disk surface is dedicated to servo information and a small portion of each remaining disk surface also contains servo information.

Servo data read enables measurement or estimation of various parameters including head position, velocity and acceleration and to use these parameters in the closed-loop control of the position of the head. For example, during track following where a head is controlled to follow a selected track on the disk, track mis-registration (TMR) is determined using a position error signal (PES) generated from servo information on the disk to indicate relative distance between the head and the center of the selected track. The PES is used to generate correction signals which adjust the position of the head by adjusting the amount of current applied to the VCM coil. Additionally, during a seek, which involves the acceleration and subsequent deceleration of the head from an initial track to a destination track on a disk, the measured or estimated radial velocity of the head can be compared to a model or profile velocity, with correction signals being generated from the differences between the actual velocity and the profile velocity of the head.

Besides servo data read from a disk and back emf of the VCM coil, the amount of movement of the actuator due to a shock or vibration can be predicted using other components in the disk drive. As one example, the back emf of the spindle motor may be used. Back emf from winding coils of the spindle motor is typically monitored during operation of the disk drive to assure the spindle motor is operating at a desired speed. An external shock applied to the disk drive will cause a sudden measurable change in the spindle motor speed. Spindle rotational speed can also be monitored by observation of the time between servo samples read from the disk. As another example, one or more rotational and/or linear accelerometers can be included in the disk drive for the purpose of measuring external shocks or vibrations applied. Accelerometers are more typically used in notebook or more mobile computers where shocks or vibrations may be expected during operation to enable corrections to be made should the actuator be knocked out of position, or at least to allow a write operation to be halted before any damage is done to tracks adjacent to the target track.

With increased track densities and rotational speeds of disk drives, closed-loop control of head position has become increasingly critical to minimize TMR. In one case to improve control of actuator head position, combining measurement techniques to determine actuator movement has been contemplated. The combined measurement techniques included measurement of back emf from the VCM which was continued after servo data could be read from the disk. This combination of measuring back emf and using servo data to correct for TMR is disclosed in U.S. Pat. No. 5,844,743, entitled "Velocity Sensing Using Actuator Coil Back-EMF Voltage," which is incorporated herein by reference.

Combining measurement techniques to measure and correct for actuator movement caused by vibrations or shocks, however, may not improve the performance of a system controlling TMR. The additional sensors used may provide noisy or low-resolution signals, and servo corrections made on the basis of those signals may actually add more TMR than they eliminate. To improve disk drive system performance, there is a continuing need for improved approaches to control TMR.

SUMMARY

In accordance with the present invention, TMR correction is made using a combination of servo position error signals (PES) and one or more alternative disturbance sensing schemes, without suffering greatly from noise or low resolution problems of previous methods for TMR correction.

The present invention is made with recognition that the unconditional use of one of the alternative sensing schemes, including spindle motor speed determined from a frequency of servo markers passing a transducer head, VCM back-emf, spindle motor back emf, and/or accelerometer signals to control the position of the transducer may actually increase the TMR of the R/W head during normal operation and may only improve it when the dominant source of TMR is an external disturbance.

In accordance with the present invention, information is obtained from one or more of the alternative sensing schemes. The expected TMR that should have resulted with the signal generated by the alternative sensing scheme(s) is simulated based upon a model of the system, and corrections are applied using the alternative sensing scheme only if the expected TMR due to the disturbance is large enough (or exceeds a threshold) so that application of the corrections using the alternative sensing scheme would likely reduce the total TMR.

In one case, actual operation is occasionally performed with and without corrective TMR feedback from one or more of the alternative sensing schemes. The actual values are then compared with predicted values from the system model, and the results are used to update the system model.

With conditional TMR correction based on measurements from one or more of the alternative sensing schemes in accordance with the present invention, performance of a drive subjected to large external disturbances is improved. Conditional TMR correction is particularly important for drives intended for mobile applications. Conditional TMR correction may, however, also be beneficially applied to drives in high-speed server applications, where external disturbances from other nearby drives occasionally cause high TMR.

BRIEF DESCRIPTION OF THE DRAWINGS

Further details of the present invention are explained with the help of the attached drawings in which.

DETAILED DESCRIPTION

Figure 1:
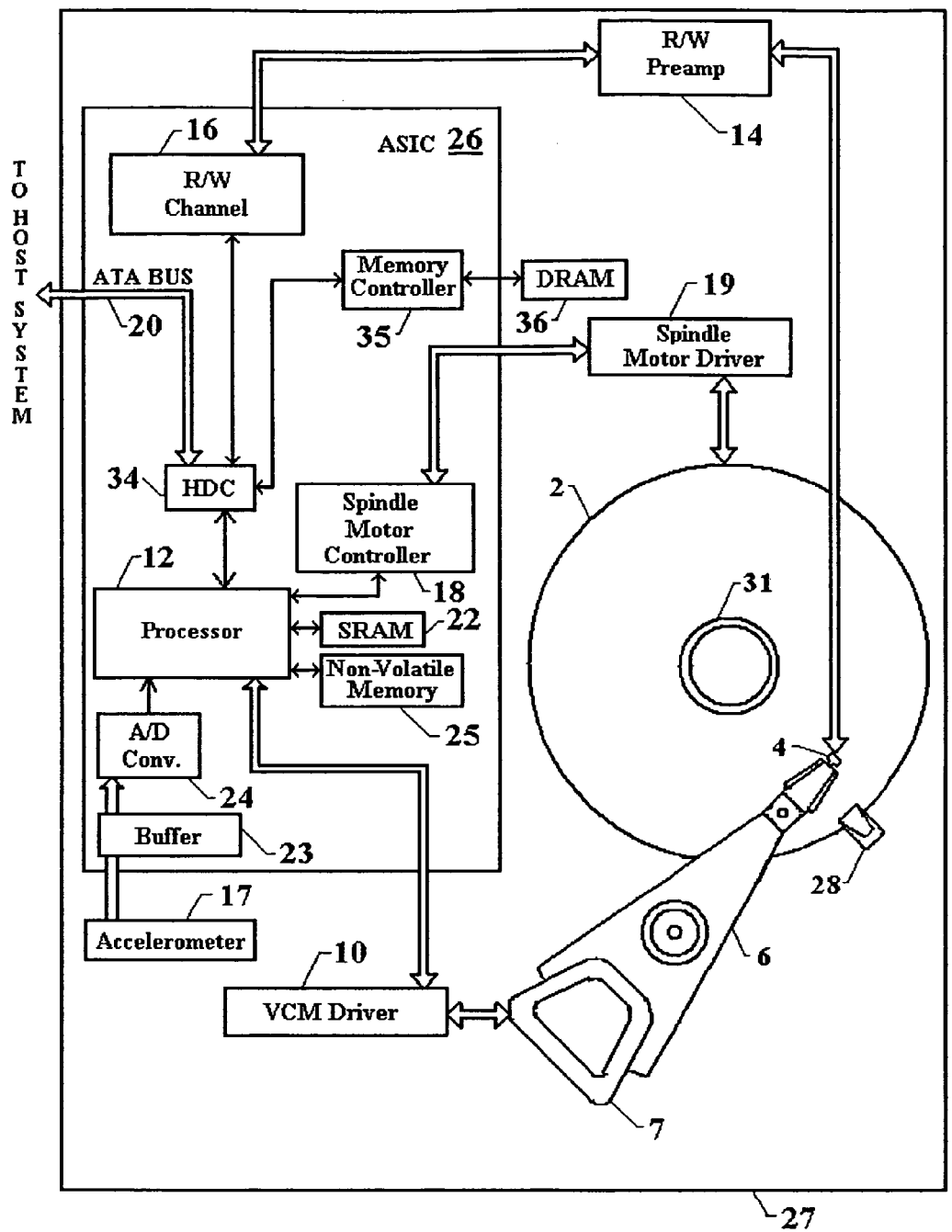
FIG. 1 shows a block diagram of components of a hard disk drive system with components enabling TMR correction to be made due to an external shock or vibration in accordance with the present invention.

FIG. 1 shows a block diagram of components of a hard disk drive system with components enabling TMR correction to be made due to an external shock or vibration in accordance with the present invention. The hard disk drive includes a rotating disk 2 containing a magnetic medium for storing data in defined tracks. Data is written to or read from the disk 2 using a transducer or read/write head 4 provided on an actuator 6. The actuator movement is controlled by a voice control motor (VCM) 7 made up of a coil configured for receiving an external control signal, and a magnet (the magnet is not shown in FIG. 1).

Current is provided to the coil of the VCM 7 using a VCM driver 10. Details of the VCM driver 10 and VCM 7 are described subsequently with respect to FIG. 3. The VCM driver 10 in turn receives current command signals from a processor 12 to control the amount of current applied to achieve a desired movement of actuator 6.

To control the actuator 6 using a closed loop servo control technique, the processor 12 receives data from the rotating disk 2. The data is read from or written to the rotating disk 2 using the transducer head 4. The analog data read is provided through a read/write (R/W) pre-amplifier 14. The amplified read data is provided to the R/W channel 16, which includes circuitry to condition the analog signal, convert the data from analog to digital and decode the digital data to provide to the hard disk controller (HDC) 34. The R/W channel 16 further transmits data received from the HDC to be written to the R/W preamp 14 which converts it to an analog signal to be sent to transducer head 4. The data read includes servo data provided in digital form from the HDC 34 to the processor 12.

Figure 2:
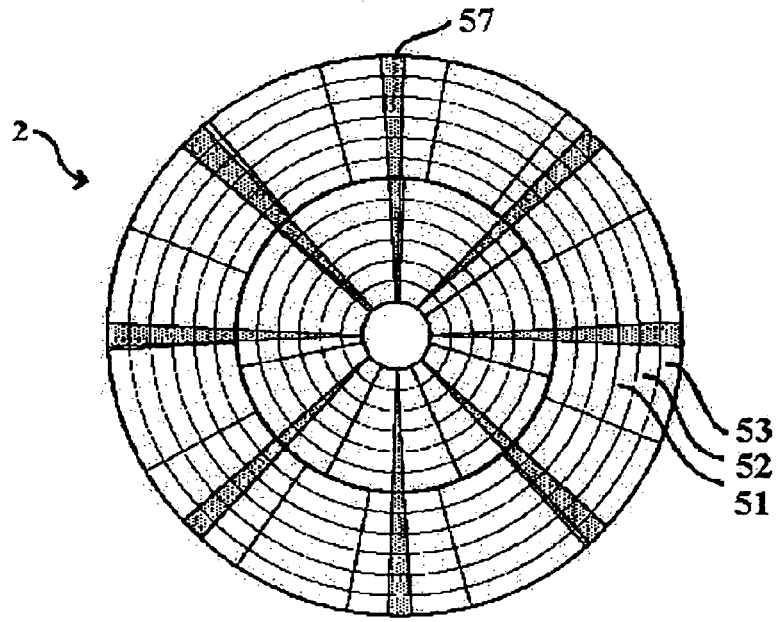
FIG. 2 illustrates data written in tracks on a disk with defined servo sectors.

In the closed loop servo system, servo data provided to the processor 12 includes information indicating track positioning of the transducer head 4 over the rotating disk 2. The track positioning information indicates the track the transducer head 4 is placed over, as well as any misalignment of the transducer head 4 relative to a track. Servo data is recorded periodically along each track in servo sectors, such as 57, on the rotating disk 2 between other non-servo data as illustrated in FIG. 2. FIG. 2 shows a number of data tracks 51–53 programmed on a rotating disk. The placement of servo sectors, such as 57, between data sectors in the data tracks 51–53 illustrates that while the servo sample-rate generally stays the same across the stroke of the drive, there are usually more data-sectors at the outer diameter (OD) (due to its increased circumference, relative to that at the inner diameter ID). A real-time servo control algorithm is typically run on an interrupt basis on the processor, with the interrupt being triggered when a servo sector is passed by a read/write head 4 using servo demodulation hardware typically provided in the HDC 34. The processor 12 determines track mis-registration (TMR) from the servo sector data read and creates a servo current command signal for providing to VCM driver 10 to correct for the track misalignment. In a system where the actuator arm rotates about a pivot point such as a bearing, the servo wedges may not extend linearly from the ID of the disk to the OD, but may be curved slightly in order to adjust for the trajectory of the head as it sweeps across the disk.

The processor 12 can provide control commands to a spindle motor controller 18 to control the operation speed of the spindle motor. The spindle motor controller 18 in turn provides control signals to the spindle motor driver 19, which in response applies current to the windings of the spindle motor to cause the desired motor speed. The spindle motor driver 19 is described in more detail subsequently with respect to FIG. 4.

Processor 12 executes instructions acquired from a stored control program to control disk drive functions. During startup, the control program is embedded in flash memory, or other non-volatile memory 25 connected to processor 12 and then either executed directly, or loaded into a random access memory RAM 22 connected to the processor 12 and executed. Various firmware routines are stored in memory locations for controlling the operation of the actuator 6 and spindle motor 30. Here, control programs include the instructions the processor 12 executes, and tables, parameters or arguments used during the execution of these programs.

The processor 12 also communicates with the HDC 34 which has access to components external to the hard disk drive system, for example, through an advanced technology attachment (ATA) interface bus 20. As illustrated the ATA bus 20 can be connected to a host system operating the disk drive. The ATA bus 20 can also be referred to as an integrated drive electronics (IDE) bus, and although specifically shown as an ATA bus, may be another type of external component interface in accordance with the present invention. The HDC 34 further accesses a memory controller 35 that drives an external DRAM memory 36. The memory controller 35 can include circuitry to control the refreshing of the DRAM 36, as well as circuitry to arbitrate between the various functions that need to access the DRAM 36 (data to/from the disk 2, refreshing operations, data/instruction accesses from the processor 12, etc). Control programs for the processor may reside on the disk 2, in DRAM 36, non-volatile memory 25, or in RAM 22 directly accessible by the processor.

For a hard disk drive, application specific integration circuits (ASICs) have been created to integrate a number of circuit components onto a single chip. One such ASIC 26 is illustrated in FIG. 1. As shown, the ASIC 26 integrates the processor 12, RAM 22, R/W channel 16, spindle motor controller 18, HDC 34, memory controller 35 for an external DRAM 36, and ATA interface bus 20 all onto a single chip. The chip for disk drive control is typically referred to as a system on a chip (SOC).

Although shown as separate components, the VCM driver 10 and spindle motor driver 19 can be combined into a single "hard disk power-chip". It is also possible to include the spindle speed control circuitry in that chip. The processor 12 is shown as a single unit directly communicating with the VCM driver 10, although a separate VCM controller processor may be used in conjunction with processor 12 to control the VCM driver 10. Further, although spindle motor controller 18 is shown as a separate entity from processor 12, it is understood that a spindle motor control algorithm (part of what is referred to by spindle motor controller 18) may be combined into the processor 12.

Figure 3:
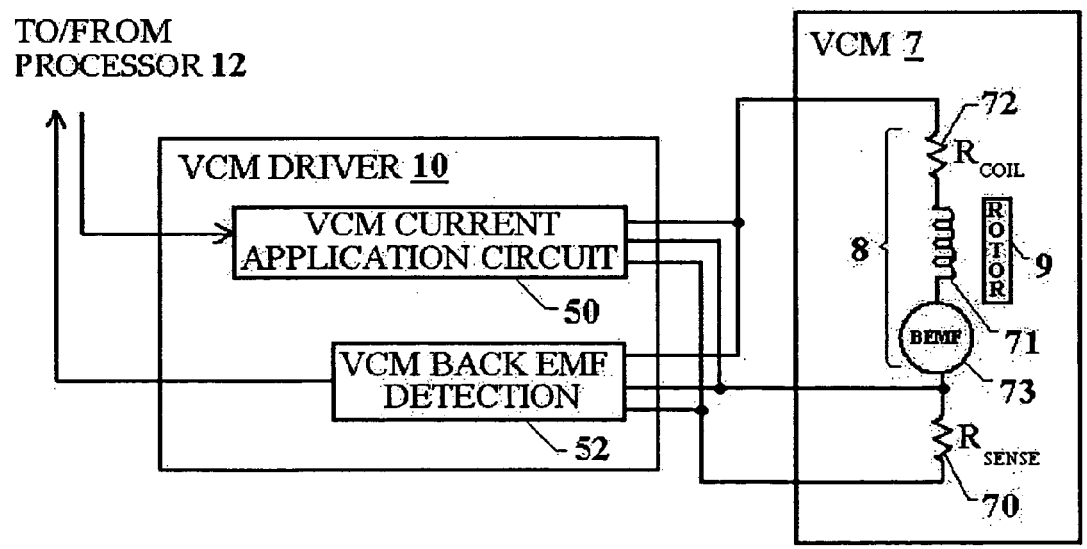
FIG. 3 shows details of the VCM driver of FIG. 1.

FIG. 3 shows details of the VCM driver 10 of FIG. 1 as connected to the VCM 7. As shown, the VCM driver 10 includes a VCM current application circuit 50, which applies current to the coil 8 of the VCM 7 with a duration and magnitude controlled based on a signal received from the VCM driver 10. The coil 8 is modeled in FIG. 3 to include a coil inductance 71, a coil resistance 72 and a back emf voltage generator 73. Current provided through the coil 71 controls movement of the rotor 9, and likewise movement of the rotor generates a back emf voltage in voltage generator 73.

The VCM driver 10 further includes a back emf detection circuit 52 for sensing the velocity of the actuator based on an estimate of the open-circuit voltage of the VCM 7. The open-circuit voltage of the VCM is estimated by observation of the actual VCM voltage and the VCM current (either the commanded current or the sensed current, sensed using a series resistor 70), and multiplication of the current by an estimated VCM coil resistance and subtraction of that amount from the measured coil voltage. As indicated previously, during shut down, the actuator 6 is positioned on a ramp 28 situated off to the side of a disk 2 to prevent contact between the transducer head 4 and disk 2. During startup, actuator velocity down the ramp 28 is controlled using measurements from the VCM back emf detection circuit 52 so that the slider of transducer 4 flies when it gets to the bottom of the ramp 28 and does not contact the disk 2.

In one embodiment of the present invention, measurements of VCM back emf are also made using the VCM back emf detector 52 and VCM driver 10 after startup when closed loop servo control begins using servo data from disk 2. The VCM back emf information is provided from the VCM driver 10 to the processor 12. The processor 12 then uses the VCM back emf measurements either alone or in conjunction with the servo data from disk 2 to improve servo control should an external disturbance occur. In accordance with the present invention, the processor 12 uses a system model to identify when the TMR due to the disturbances sensed from measurement of the back-EMF exceeded a threshold, and conditionally applies TMR correction using the VCM back emf when it is beneficial. More details of the system model used to set thresholds are described below.

Figure 4:
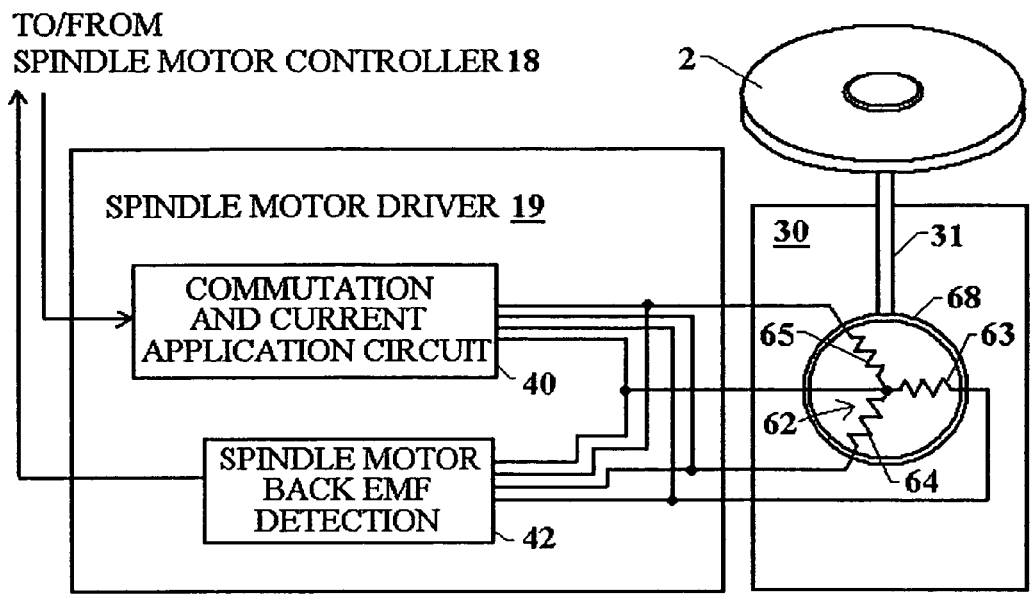
FIG. 4 shows details of the spindle motor, along with further details of the spindle motor driver of FIG. 1.

FIG. 4 shows details of the spindle motor 30 supporting the rotor shaft 31, and the spindle motor driver circuit 19. The spindle motor 30 includes a coil 62 with three windings 63, 64 and 65 electrically arranged in a Y configuration. A rotor 68 of the spindle motor 30 has magnets that provide a permanent magnetic field. The spindle motor driver circuit 19 supplies current to windings 63–65 to cause rotor 68 to rotate at a desired operating spin-rate. The spindle motor driver 19 includes a commutation and current application circuit 40 to apply different commutation state currents across windings 63–65 at different times. The commutation and current application circuit 40 applies the commutation state currents based on signals received from the spindle controller 18. The spindle motor controller 18 monitors the time period between back emf zero crossings using the spindle motor back emf detector 42 and uses this time period information to enable determination of the speed of spindle motor 68. The speed indication is then used by the spindle controller 18 to control the commutation voltages applied across windings 63–65 to accomplish a desired speed.

Figure 5:
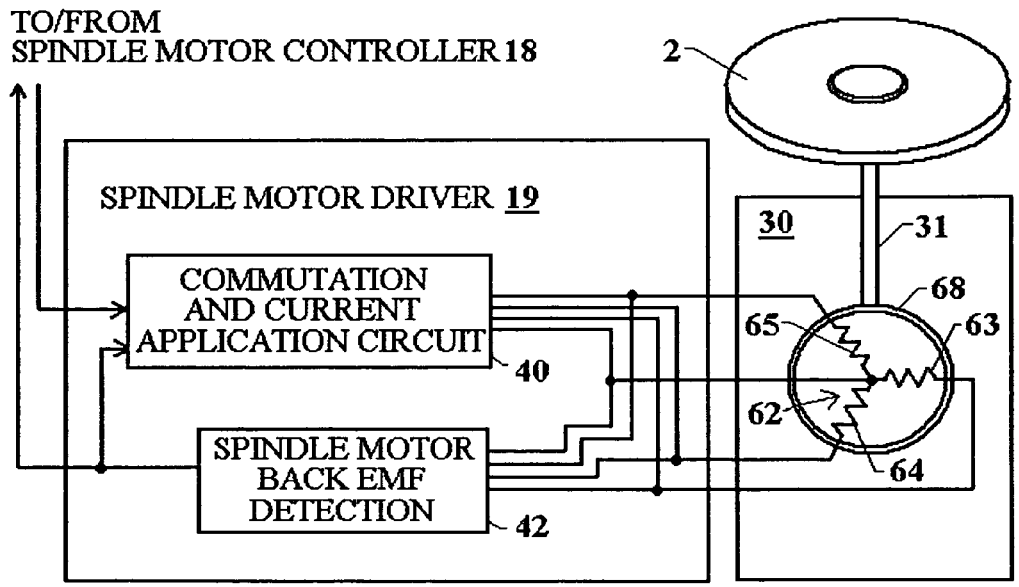
FIG. 5 shows an alternative configuration for the spindle motor driver.

FIG. 5 shows an alternative configuration of the spindle motor driver circuit 19. As shown, the commutation and current application circuit 40 receives the back emf zero crossing signals from the spindle motor back emf detector 42. The commutation circuit 40 then includes circuitry to calculate the current application states needed to obtain a desired speed based on a spindle motor speed indication determined from the spindle motor back emf detector 42 (during steady-state operation; during open-loop startup, commutation states are determined internally or provided from the spindle controller 18). In the embodiment of FIG. 5, some (or all) of the processing to performed by the spindle motor controller 18 of FIG. 4 is included in the commutation circuit 40. The spindle controller 18 then may be either removed, or configured to provide only clocking or desired spindle motor speeds to the commutation circuit 40.

In one embodiment of the present invention, using either the circuitry of FIG. 4 or FIG. 5, measurements of spindle motor speed are also made using the spindle motor back emf detector 42 to detect external disturbances such as a rotational shock or vibration. The spindle motor back emf information is provided from the spindle motor controller 18 to the processor 12. The processor 12 then uses the spindle motor back emf measurements in conjunction with the servo data from disk 2 to improve servo control should an external physical shock occur.

In a further embodiment of the present invention, measurements of spindle motor speed are made using servo address markers (SAM) read from the servo data on disk 2. The SAMs occur in the servo data received by the processor 12, and like the rest of the servo data the SAMs occur periodically enabling the processor 12 to determine the rate of speed the spindle motor 30 is operating.

In accordance with the present invention, the processor 12 uses a system model to identify when the TMR due to the external disturbances that caused spindle motor speed variations are likely to exceed a threshold where correction for TMR would be beneficial. If the threshold is exceeded, the processor 12 makes adjustments to the control algorithm that it uses to determine the appropriate current commands that it sends to the VCM driver 10, using information obtained from the spindle motor speed measurement to correct for the TMR.

In a further embodiment of the present invention, signals are provided from an accelerometer 17 attached to a housing 27 containing the disk drive system components to detect an external disturbance such as a shock or vibration. The accelerometer 17 may be either a rotational accelerometer or a linear accelerometer. As a rotational accelerometer, the rotational acceleration experienced by the accelerometer 17 in the disk drive will reflect the rotational acceleration applied to the actuator 6. A number of linear accelerometers can make up such a rotational accelerometer, so it is contemplated that linear accelerometers can be used in place of the rotational accelerometer if design considerations so dictate. The accelerometer 17 can likewise be a single linear accelerometer if design requirements so dictate. One or more linear accelerometers may be beneficial for a particular design should a primarily linear (not rotary) disturbance be expected. A linear accelerometer will reflect acceleration applied to the actuator 6 in one direction only. Multiple linear accelerometers set to measure linear acceleration in different directions can be used if shock applied in more than one particular direction that will affect the actuator.

The signal from the accelerometer 17 is provided through a buffer 23 (or conditioning circuit) and A/D converter 24 to the processor 12. In accordance with the present invention, the processor 12 uses a system model to identify when the magnitude of the TMR resulting from the acceleration sensed by the accelerometer 17 exceeds a threshold where correction for that TMR would be beneficial. If the threshold is exceeded, the processor 12 makes adjustments to the control algorithm that it uses to determine the appropriate current commands that it sends to the VCM driver 10 using the rotational accelerometer signal.

In further embodiments of the present invention, combinations of two or more of the alternative sensing schemes including VCM back emf, spindle motor speed and accelerometer measurements are used in combination with servo data in a closed loop control system. As with other embodiments, the processor 12 uses a system model to identify when the TMR predicted by a system model using measurements from a combination of the alternative sensing schemes exceeds a threshold where correction for that TMR would be beneficial. If the threshold is exceeded, the processor 12 sends a signal to the VCM driver 10 to make proper adjustments to the actuator 6 to conditionally correct for the TMR using two or more of the alternative sensing schemes.

The system model used by the processor 12 to determine a threshold is provided as code in a memory accessible by the processor, such as RAM 22, described above. In one embodiment, the system model takes the form of a state-space model of the entire servo loop which accounts for both the mechanics and the nominal (without extra sensors) servo loop characteristics in a calculation of actuator movement in response to a disturbance. Further, TMR is determined as caused by sources other than by external disturbances. Effectiveness of corrections for TMR are then determined based on TMR caused by a combination of both external disturbances and TMR from other sources to determine whether TMR correction using the alternative sensor input(s) should be applied. A threshold is set where TMR correction due to the alternative sensor measuring a disturbance will be more effective than if the correction were not applied with the alternative sensor. Generally, the threshold will be exceeded when the TMR due to an external disturbance is significantly greater than general TMR not due to the external disturbance.

Figure 6:
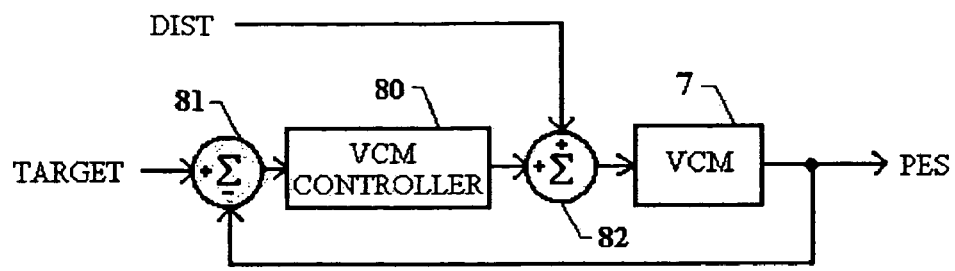
FIG. 6 shows a diagram for a model used in simulating a system for the VCM servo loop.

As one example, a model was created using a derivative of spindle motor speed variation determined from a frequency of servo address markers (SAMs) passing a transducer head to detect a disturbance and provide disturbance rejection. Although other feed forward measurements can be used, spindle motor speed used in the model was preferred. In the absence of a closed loop spindle-speed control system, the derivative of spindle speed provides an accurate representation of disturbance. In the presence of a closed loop spindle-speed control system with significant response capability in the frequency-ranges of interest, the derivative of spindle speed would have to be post-processed to determine an estimated disturbance, using mathematical techniques that are well known to one of ordinary skill in the art. For the system examined in Appendix A, the spindle-speed control system was slow enough that the derivative of the spindle speed provided a good indication of the disturbance. The example model was run and simulation results were providing using MATLAB® by Mathworks, with comments included indicting that a feed forward signal used is the derivative of spindle motor speed. The MATLAB® program is attached as Appendix A. The output by a run of the MATLAB® program of Appendix A is provided in Appendix B. The results demonstrate vibration rejection technology on an idealized disk drive servo loop. Although idealized, noise simulation is applied to simulate a disk drive operating in a non-ideal environment. The initial parameters for the model were as follows:

VCM moment radius in inches=2.0
Tracks per inch=100,000
Servo sectors (or wedges) per revolution of the disk=150
Spindle Motor Speed In Revolutions Per Second=90
Servo Loop Clock Frequency=800×10$^6$
Samples To Simulate=10×Wedges Per Revolution
Sample Time=1/(Wedges Per Revolution×Spindle Motor Speed)
Disturbance Amplitude=100 rad/sec$^2$
Disturbance Frequency=50 Hz
Disturbance Type=A sine wave A diagram for a model used in the system for the VCM servo loop is shown in FIG. 6. As shown, the system includes the VCM controller 80 and VCM 7 connected in series. As indicated previously, the processor 12 of FIG. 1 can function as a VCM controller 80. The output of the VCM 7 is the position error signal (PES) indicating TMR typically obtained from servo information read from the rotating disk. The PES output is a head position indicated in tracks. Feedback in the form of the track position error signal (PES) is then provided from the VCM 7 output and is subtracted in summer 81 from the TARGET input to provide the VCM controller 80 input. A unity feedback system is, thus, formed. The target (TARGET) input to the VCM controller 80 is a PES of zero, which remains constant (simulating tracking, as opposed to seeking, control of the actuator). A disturbance (DIST) is added into the system as an input to a summer 82 between the VCM controller 80 and VCM 7.

The output VCM controller 80 provides a second input to the summer 82, and the output of the summer forms the input of the VCM 7. By providing the disturbance value in this manner, the model will represent a system where some outside entity is pushing and/or pulling the transducer head. In the simplified model, the system has three states as follows:

State 1: The VCM angular position (in radians)
State 2: The VCM angular velocity (in radians per second)
State 3: The internal state of the controller.

Of course, as would be known to one of skill in the art, an accurate model of a modern disk-drive VCM control loop would have many more states in both the VCM and in the controller. The description here has been reduced to a minimal level of complexity in order to most easily disclose the present invention.

Figure 7:
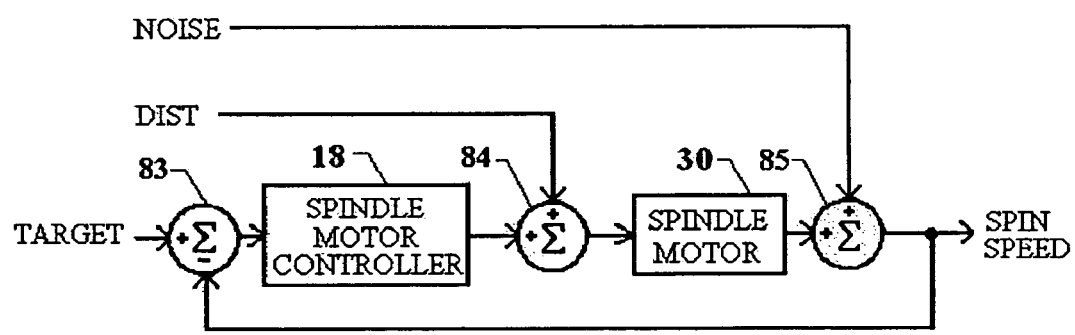
FIG. 7 shows a further diagram for the system model simulating a spindle motor control loop.

A further diagram for the system model shows a spindle motor control loop in FIG. 7. The construct is similar to the VCM loop, and includes the spindle controller 18 in series with the spindle motor 30. The output of the spindle motor 30 is a spin speed indication (SPIN SPEED) which can be measured using rate of servo wedges passing the transducer head. Feedback in the form of the spindle motor speed (SPIN SPEED) is then provided from the spindle motor 30 to the input of a summer 83 to be subtracted from a target speed (TARGET) applied to a second input of the summer 83. The output of summer 83 is applied as an input to the spindle motor controller 18. The same disturbance (DIST) applied in FIG. 6 is fed into the input of a summer 84 where it is added with the output of the spindle controller 18. The output of summer 84 is then applied to the input of the spindle motor 30. This diagram further includes injection of a noise element (NOISE) into the spindle motor speed (SPIN SPEED). The (NOISE) input is added to the spindle motor speed output from spindle motor 30 in summer 85. The output of the summer 85 then provides the overall SPIN SPEED. Because only spindle motor speed (SPIN SPEED) is needed for system operation of this model, the only state of the diagram of FIG. 7 is the spin speed (in radians per second). As was the case with the VCM control-loop model, a more accurate model of the spin-speed control-loop would have additional states. Again, this description has been simplified in order to most easily disclose the present invention.

In the model, parameters for sampling frequency, disturbance, and noise are set. A frequency vector is established with frequency increasing in increments of 0.001 times the Nyquist frequency up to the Nyquist frequency. The disturbance used is a sine wave having equal positive and negative (push and pull) pulses. The units of the disturbance, expressed as an angular acceleration, are provided in radians/second. White noise is applied to the spindle speed output to simulate the effects of written-in timing-runout, as well as electrical noise and race conditions in the servo address marker (SAM) to SAM timing measurement.

Figure 8:
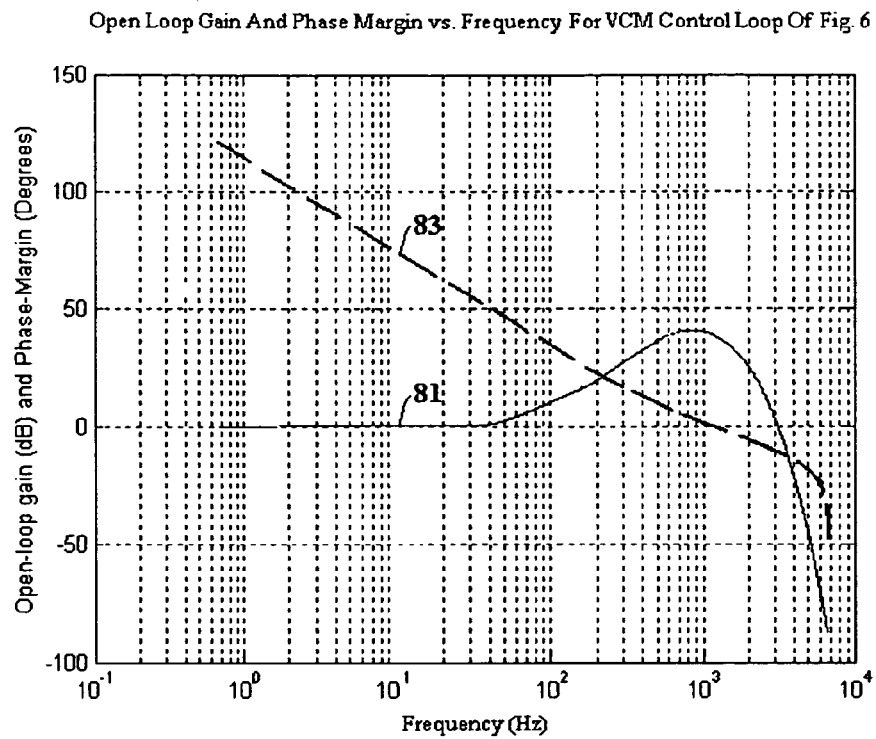
FIG. 8 shows a plot of open-loop gain and phase-margin for the VCM control loop in FIG. 6.

FIG. 8 shows a plot of open-loop gain 83 and open-loop phase-margin 81 for the VCM control loop in FIG. 6. For low frequencies, the open-loop gain falls, varying roughly in proportion to the inverse of the frequency squared. As the frequency approaches the open-loop crossover frequency (~1200 Hz), the rate at which the gain falls off is reduced by the phase-lead of the controller. As the frequency approaches the Nyquist frequency (based upon the servo sample-rate of 6750) the gain falls more rapidly. The phase-lead produced by the controller is evident in the "phase bubble" of curve 81 in the vicinity of the gain-crossover frequency.

Figure 9:
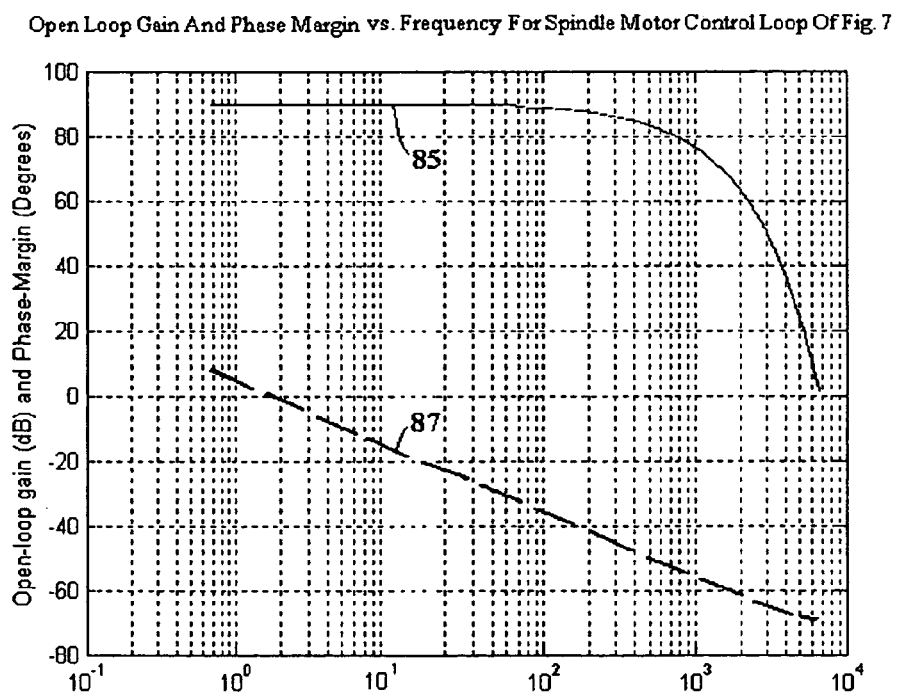
FIG. 9 shows a plot of open-loop gain and phase margin for the SPIN SPEED control loop of FIG. 7.

FIG. 9 shows a plot of open-loop gain 87 and open-loop phase margin 85 for the spindle motor control loop of FIG. 7. In that plot, the open-loop gain is seen to fall, varying roughly in proportion to the inverse of the frequency for the entire plot. The phase-margin is nearly 90% in the vicinity of the gain-crossover frequency (a little under 2 Hz).

Figure 10A:
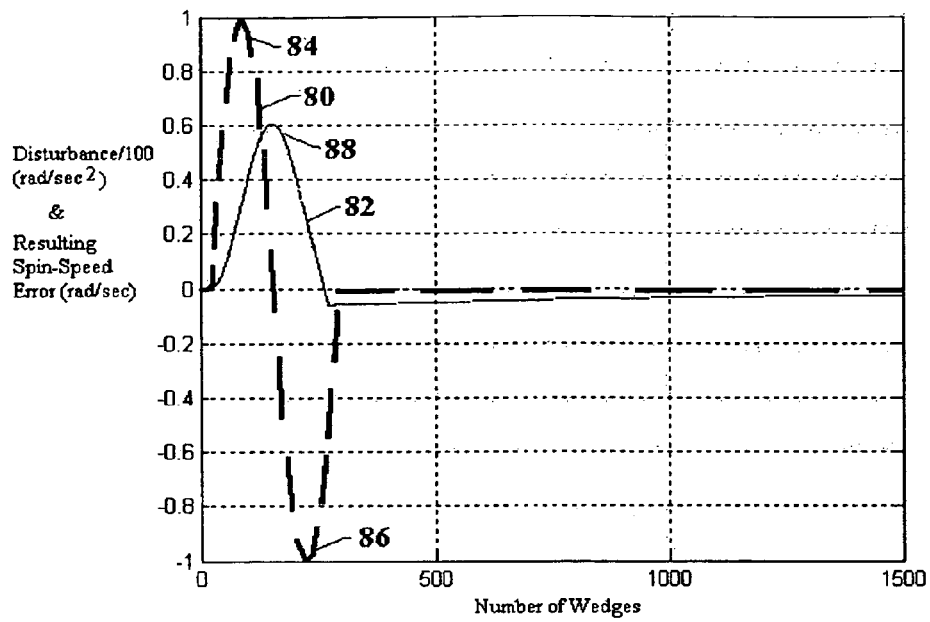
FIGS. 10A–10B show plots of a disturbance and a resulting spin speed error signal.

FIG. 10A shows a plot of a disturbance 80 applied and a resulting spin speed error signal 82 (the difference in the SPIN SPEED and TARGET SPEED) vs. a servo wedge count. The disturbance 80 is measured as a rotational acceleration in radians/sec$^2$. The resulting spin speed error signal 82 is the difference between the spin speed velocity output from FIG. 7 and the desired spin speed in radians per second as determined in the spindle motor controller 18 in the diagram of FIG. 7. The spin speed error 82 and disturbance 80 are plotted verses wedges passing the transducer head ranging from 0 to 1500. The amplitude of disturbance signal 80 is scaled by dividing by 100 to enable a comparison.

Figure 10B:
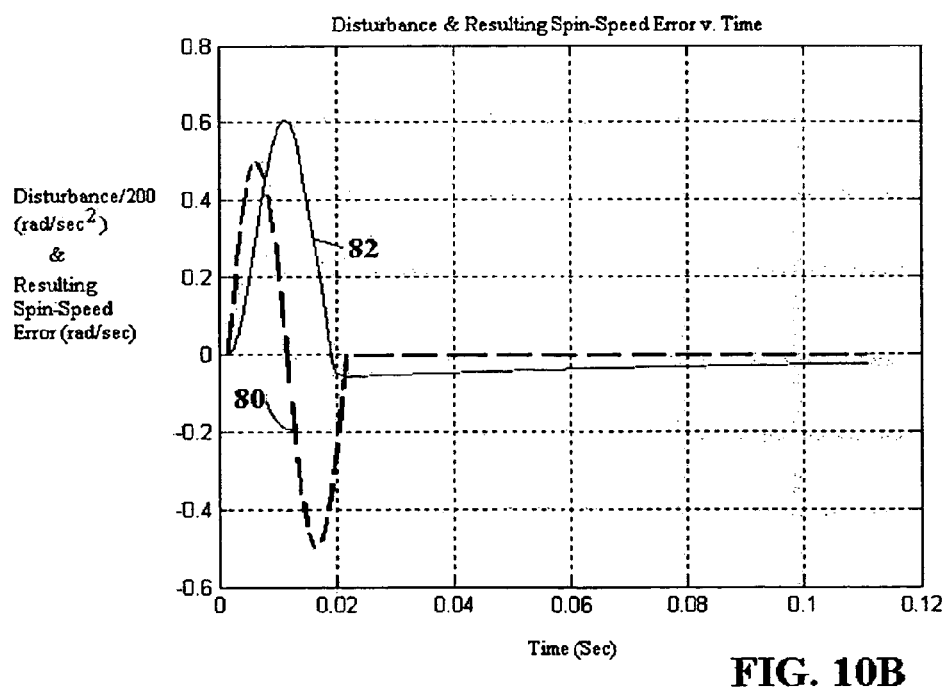

For reference, FIG. 10B shows the disturbance 80 and a resulting spin speed error signal 82 of FIG. 10A, but plotted against time in seconds. The disturbance signal 80 amplitude is scaled by dividing by 200, instead of 100 as in FIG. 10A, for a slightly different comparison. As shown, the plots remain substantially the same irrespective of plotting against a wedge count or plotting against time.

Figure 11A:
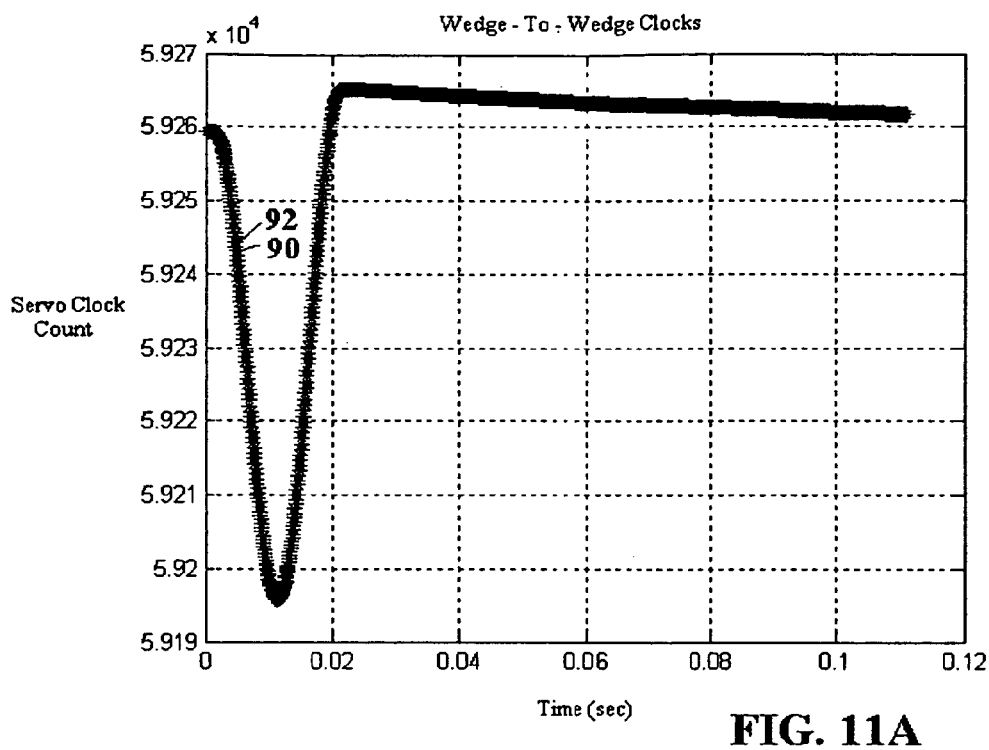
FIGS. 11A–11B show a plot of wedge to wedge servo detection clocks when a disturbance is applied.
Figure 11B:
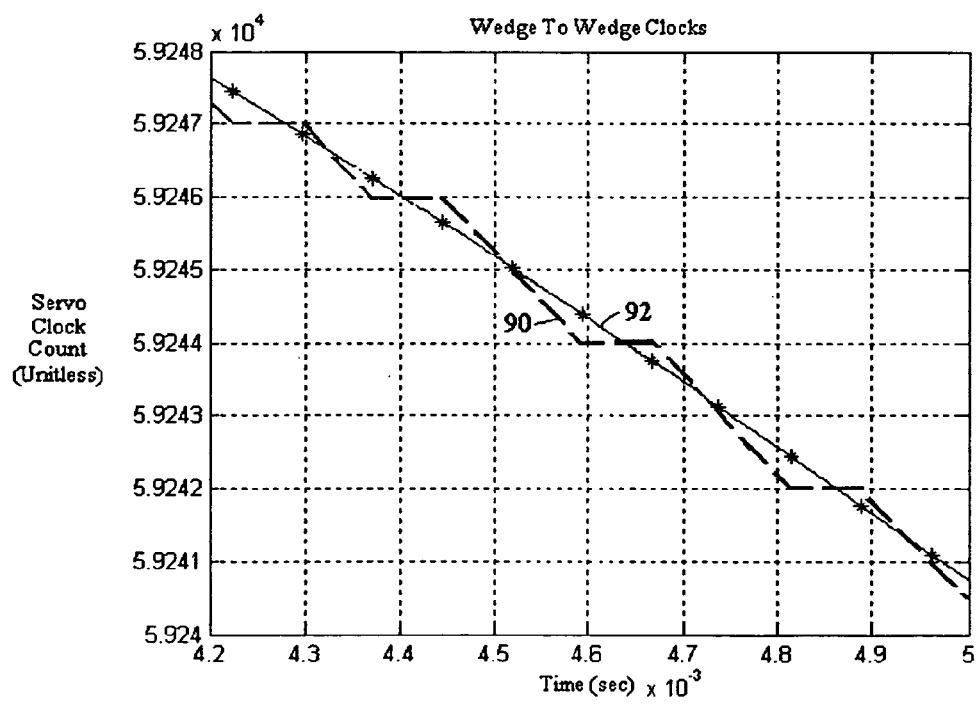

FIG. 11A shows two plots of wedge to wedge servo detection clocks when a disturbance is applied, one plotted as if the clock had infinite resolution 92, and the other 90 with clock count rounded to integer counts over finite time periods (as would occur in a real system implementation). The vertical axis in FIG. 11A shows servo clock counts, where each clock-count represents a time equal to 1/800000000 seconds with the servo clock frequency set at 800 MHz for the finite resolution plot 90. FIG. 11B shows a zoom-in on a portion of the plot shown in FIG. 11A. The stars shown on the infinite resolution clock line 92 show where servo wedges occur. The limited clock rate of 800 MHz will cause some wedge-to-wedge correction offset errors, as shown. With a substantial increase in the clock rate, the correction errors would be reduced.

Figure 12A:
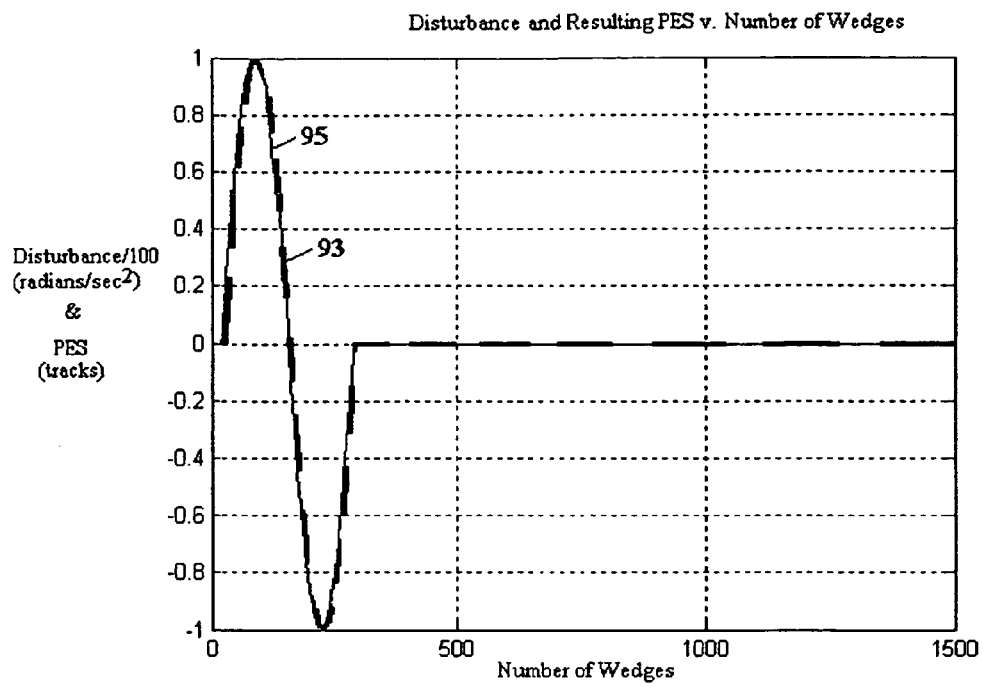
FIGS. 12A–12B shows a plot of a disturbance applied to the diagram of FIG. 6 along with a resulting PES output.

FIG. 12A shows a plot of a disturbance (DIST) 93 applied to the diagram of FIG. 6 along with a resulting PES output 95. The PES output 95 is plotted as an offset in tracks versus wedges passing by the transducer head. The disturbance 93 is plotted as an acceleration magnitude in radians/sec versus wedges passing by the transducer head up to 1500. The disturbance magnitude is scaled by /100 causing the PES 95 and disturbance DIST 93 plots to overlay. Note that the actual push-pull disturbance magnitude causes a TMR of as much as 1 track width for both the push and pull. Feedback of the PES through the summer 81 to the VCM controller 80 of FIG. 6 then adjusts the track position so that the PES is well below a TMR of 0.1 tracks after the disturbance is removed.

Figure 12B:
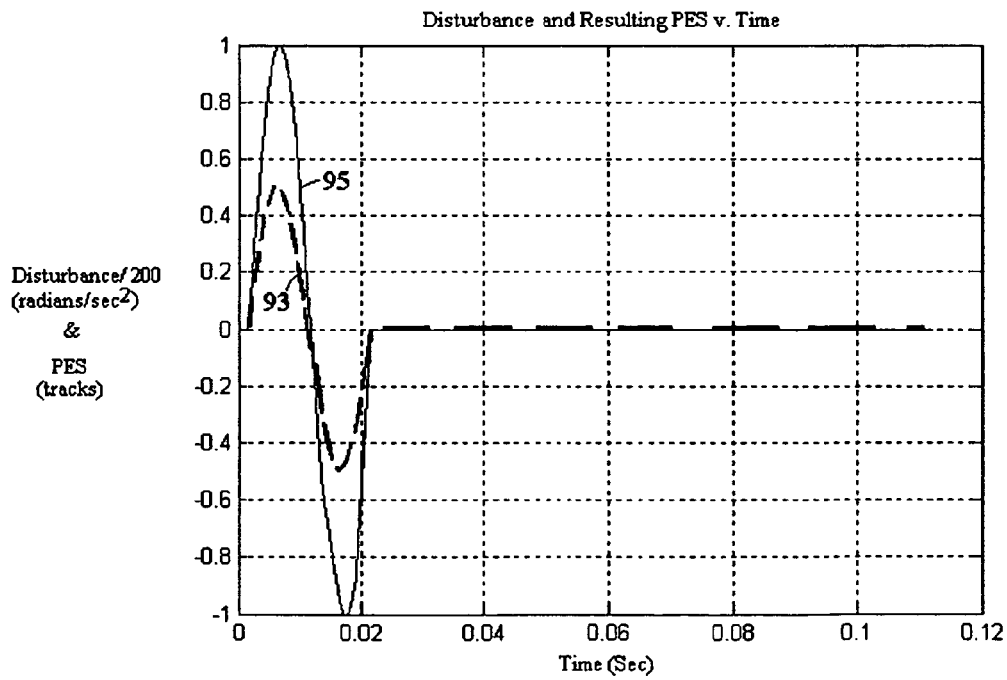

For reference, FIG. 12B shows the disturbance 93 and a resulting PES 95 of FIG. 12A, but plotted against time in seconds. The disturbance signal 93 amplitude is scaled by dividing by 200, instead of 100 as in FIG. 12A, for a slightly different comparison. As shown, the plots remain substantially the same irrespective of plotting against a wedge count or plotting against time.

Figure 13A:
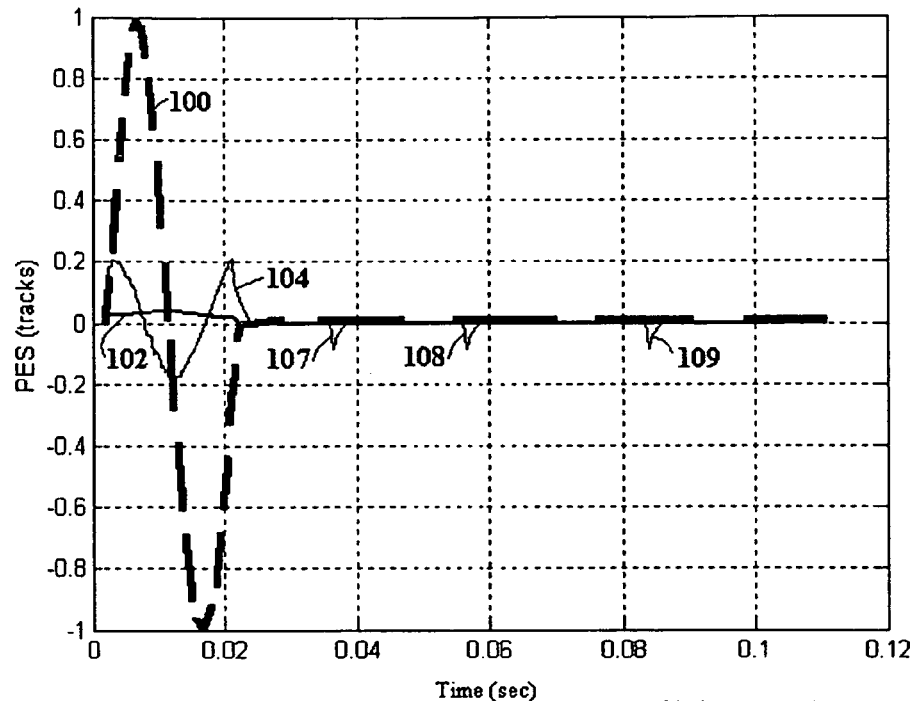
FIGS. 13A–13B show additional plots of parameters from the models of FIGS. 6–7.

FIG. 13A shows three separate plots 100, 102 and 104. The plot 100 is a dashed line showing PES output from the diagram of FIG. 6. The plots 100, 102 and 104 of FIG. 13A are all plotted as PES or track offset over a time period of 0.12 seconds.

The plot 102 is an intermediate thickness line showing the PES output from the diagram of FIG. 6 with feed forward applied from the circuit of FIG. 7, assuming a near infinite clock rate. With the plot 102, a very high clock rate (significantly higher than the 800 MHz clock actually modeled using FIG. 7), effectively provides a near perfect feed forward signal. The feed forward signal is applied to the VCM controller 80 of FIG. 6 with the output of the summer 83 of the spindle motor control loop of FIG. 7.

The plot 104 is the thin thickness line showing the PES output from the diagram of FIG. 6 with feed forward applied from spindle motor controller 18 in the circuit of FIG. 7 operating with a 800 MHz clock, and the resulting errors due to wedge-to-wedge clock edge misalignment. The effect of wedge-to-wedge clock misalignment was initially illustrated in FIGS. 11A–11B. A filter is applied to the feed forward signal from the spindle motor control loop of FIG. 7 to smooth the effect of clock misalignment. For plot 104, the feed forward signal is applied through to the VCM controller 80 from the output of summer 83 of FIG. 7 through a filter (not shown) to the VCM controller, this time with the spindle motor loop of FIG. 7 operating with an 800 MHz clock.

As shown in FIG. 13A, without feed forward in plot 100 the TMR resulting from the push-pull disturbance applied is 1 full track. Typically a TMR as great as 0.2 tracks will cause a disk drive to halt any read/write operations in progress. With a feed forward signal applied from the spindle motor control loop using near perfect corrections in plot 102, the TMR is significantly reduced to less than 0.1 tracks. Even with the spindle motor feed forward applied with the less than perfect 800 MHz clock in the plot 104, the TMR is reduced to less than 0.2 tracks. Note that once the spindle motor feed forward has been applied in plot 104, and the circuit stabilizes beyond 0.03 seconds, over correction errors occurring due to the finite servo clock resolution, such as at points 107–109, can cause TMR of approximately 0.1 tracks.

Figure 13B:
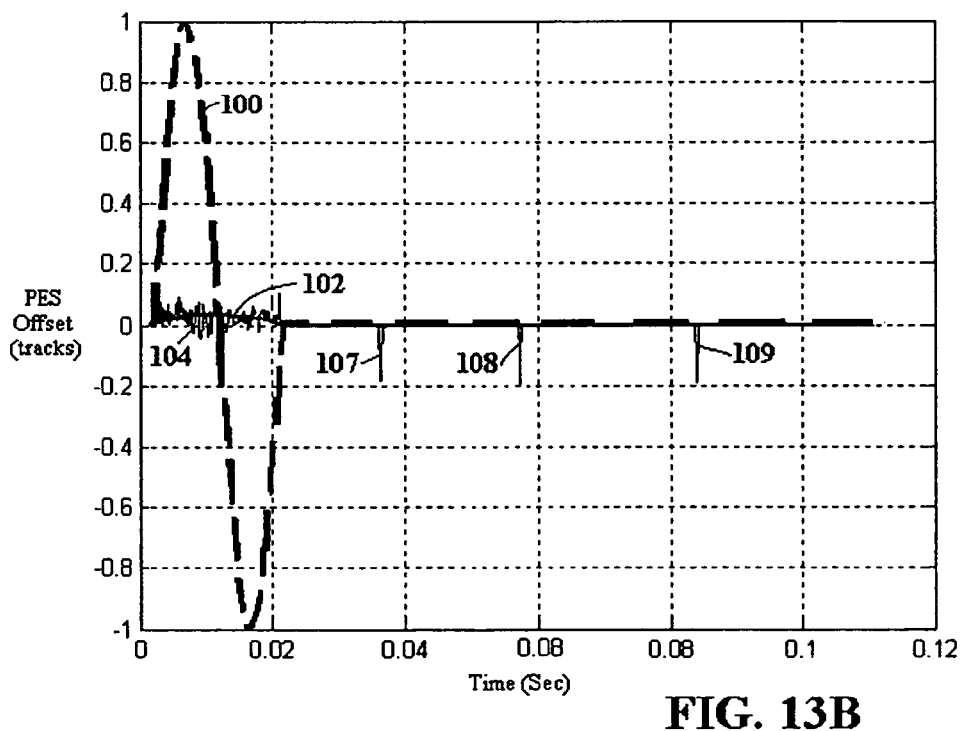

FIG. 13B shows an alternative to the plots 100, 102 and 104 of FIG. 13A, where the plot 104 is applied with a filter providing one fifth of the smoothing of the filter used in the feed forward of FIG. 13A. In FIG. 13A, the filter smoothing factor is 0.5, while in FIG. 13B the smoothing factor is reduced to 0.1. As shown in FIG. 13B, the noise on plot 104 is more defined with less filtering during the disturbance due to the wedge-to-wedge clock misalignment shown in FIGS. 11A–11B. Further, the over correction errors 107–109 due to finite clock resolution are more defined at approximately 0.2 tracks.

Figure 14A:
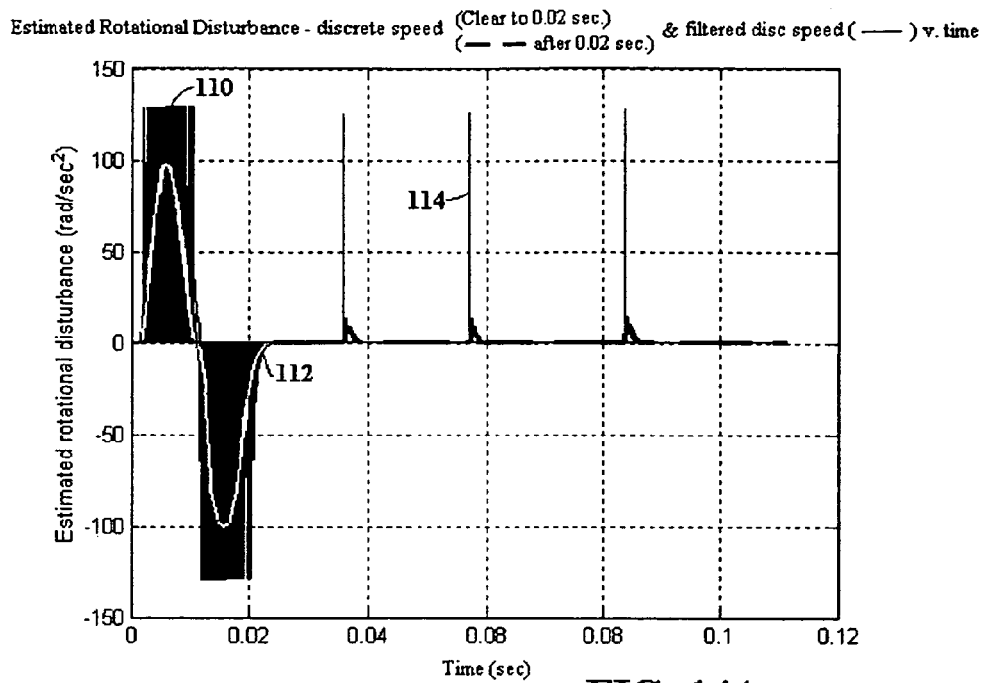
FIGS. 14–14B show additional plots of parameters from the model of FIGS. 6–7.

FIG. 14A shows the estimated rotational disturbance (in rad/sec$^2$). Plot 110 is a thin line showing the raw result of simply differentiating the wedge-to-wedge clock-count signal shown in FIGS. 11A–11B, and plot 112 shows a filtered version of the signal. The plot 112 begins as a white line to differentiate from plot 110 at less than 0.02 seconds, and changes to a thick dashed line after 0.02 seconds. The signal 112 is more appropriate for use in controlling the response of the actuator to the disturbance, since it varies much less wildly than the signal 110. The plot 112 is used to generate the feed forward signal for the filtered feed forward output 104 in FIG. 13A provided from the spindle speed loop circuit of FIG. 7. As shown in FIG. 14A, the plot 112 basically tracks the push pull disturbance applied.

Due to the noise illustrated in plots 110 and 112, it is typically desirable to use the VCM servo loop of FIG. 6 without feed forward when a disturbance does not occur, particularly in light of the over correction spikes, such as 114. With the over correction spikes 114 occurring when no disturbance is applied, a significant TMR over correction would occur with feed forward. In accordance with the present invention, the feed forward from the spindle motor control loop of FIG. 7 is only applied only when the servo controller determines that application of the feedforward is likely to reduce the overall TMR of the drive.

The determination of whether or not to apply the disturbance feedforward can be made in any of a number of different ways. In one embodiment, the servo controller can constantly run models similar to the ones described above, and switch modes (from not applying to applying disturbance feedforward) according to whichever mode gives the smallest predicted TMR. To avoid rapid mode-switches when the two predicted TMRs are nearly equal, the servo would probably use hysteresis, as would be apparent to one skilled in the art. For example, the servo could require that the feedforward mode be allowed to switch only when the predicted TMR with the current mode exceeded the other mode by more than a specified margin (say 10%).

In another embodiment, the servo could employ disturbance feedforward whenever the measured ontrack TMR exceeded a specified level. This switch would be made under the assumption that the reason for the large TMR was due to an external disturbance, and that the disturbance was likely to continue for a relatively long time. The disturbance feedforward could be turned off when the measured TMR was near to that which would be predicted for an undisturbed system with the feedforward turned on (implying that the external disturbance was gone).

In yet another embodiment, the feedforward could be used whenever the magnitude of the disturbance, itself, exceeded a specified level. In order to avoid rapid mode-switches, the measured disturbance level could be filtered before being compared to the threshold level, and the servo could use hysteresis as described above. Alternatively, the servo could switch to a mode in which disturbance feedforward was used only if the filtered disturbance exceeded a specified level for a specified period of time, and back to the "normal" mode only after a specified period of time during which the filtered disturbance was below the same (or another) level.

In yet another embodiment, a combination of the measured TMR and the measured disturbance can be used to switch between modes. For example, the servo could switch to using disturbance feedforward only if the TMR was higher than a specified threshold AND a filtered measured disturbance was beyond another specified threshold. It could switch back to "normal" mode after both the measured TMR and the filtered measured disturbance were below their respective thresholds for a specified time period.

Figure 14B:
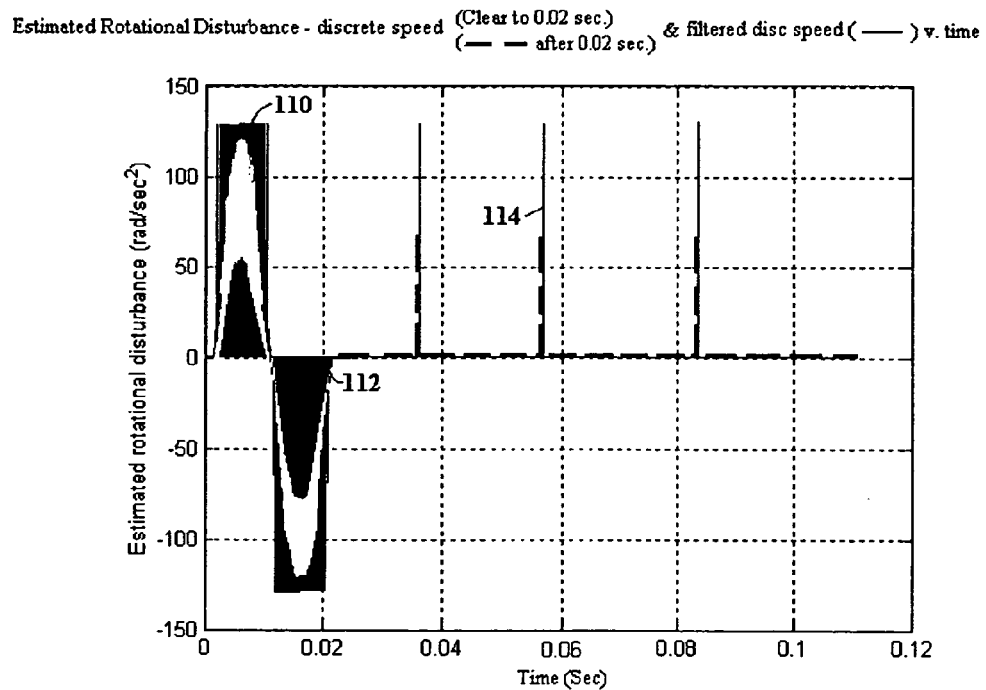

FIG. 14B shows an alternative to the plots 110 and 112 FIG. 14A, where the plot 112 is applied with the filter providing one fifth of the smoothing of the filter used in the feed forward plot 112 of FIG. 14B. The signal 112 of FIG. 14B is applied as the feed forward signal in FIG. 13B. As shown in FIG. 14B, the noise on plot 112 is more defined with less filtering during the disturbance due to the wedge-to-wedge clock misalignment shown in FIGS. 11A–11B. Further, the over correction errors 114 due to finite clock resolution are more significant. As would be understood by a person of ordinary skill, filter smoothing amount can be set to a desired value depending on factors such as the clock speed for the spindle motor, the maximum TMR considered correctable by PES alone, or other design factors.

In one embodiment of the present invention, predicted data based on a system model is checked for accuracy with actual measurements. Checking is performed to enhance the predicted data by occasionally performing actual operation with external disturbances applied while servo correction is made both with and without corrective TMR feedback from the alternative sensing scheme(s). Such checking can also be done when no external disturbances are applied (or when the external disturbances are very small), to evaluate the TMR degradation that results from control based upon signals from the extra sensors. The actual values are compared with values predicted using the system model and the model is modified if different from the actual values to enable a more informed conditional decision to be made when future disturbances, such as shocks or vibrations occur.

With minimal external physical disturbances, closed loop servo control using servo data for track following may do a better job compensating for the TMR without the use of alternative sensing techniques. Use of the alternative sensing technique in addition to the servo data with a minimal disturbance may actually degrade the TMR because of noise or resolution issues with the additional sensors. With the physical disturbance being significant enough to displace the actuator from a track so that user data can no longer safely be read or written, then use of the alternative technique is more likely to improve the TMR. With such a significant disturbance, conditional application of correction using a combination of traditional servo PES and the alternative sensing technique will improve system performance.

Although the present invention is described for use with hard disk drives for recording in magnetic media, it is understood that principles in accordance with the present invention can be used with optical disk drives, or other types of magnetic disk drives such as floppy drives. Similarly although an example model is provided using spindle motor speed determined from a frequency of SAMs passing a transducer head, models using spindle motor back emf, VCM back emf or accelerometer readings could be used if desired.

Although the present invention has been described above with particularity, this was merely to teach one of ordinary skill in the art how to make and use the invention. Many additional modifications will fall within the scope of the invention, as that scope is defined by the following claims.

APPENDIX A

MATLAB® Model

```
% This script demonstrates Operational-Vibration Rejection technology
% on an idealized disk drive servo loop.
% vcmRadiusInches = 2;
tpi          = 100e3;
wedgesPerRev = 150;
spinSpeedHz  = 90;

servoClockFrequency = 800E6;

disturbanceAmplitude = 100;   % Units are rad/sec^2
disturbanceFreqHz    = 50;
disturbanceType = 'sinewave';

samplesToSimulate  = 10 * wedgesPerRev;

sampleTime = 1 / (wedgesPerRev * spinSpeedHz);

% This is a vector of times to be used in plots and in simulations.
timeVector = [0:samplesToSimulate-1]*sampleTime;

% Define an idealized continuous-time rotational plant (rigid-mass-on-a-frictionless-plane, etc.
vcmA_continuous = [0 1; 0 0]; vcmB_continuous = [0; 1]; vcmC_continuous = vcmRadiusInches*tpi*[1 0];
vcmD_continuous = 0;
vcmPlantSys_continuous = ss(vcmA_continuous, vcmB_continuous, vcmC_continuous, vcmD_continuous);
vcmPlantSys = c2d(vcmPlantSys_continuous, sampleTime);

% Define a simple (PD) controller.
k = 100;
b = 450;
controllerNum = [(k+b) (-b)];
controllerDen = [ 1    0];
controllerSys = tf(controllerNum, controllerDen, sampleTime);

% Construct an artifact to allow us to put together a unity-feedback system (below).
straightThroughSys = tf(1,1);

% We'll need to be able to feed disturbances into the command
% (as if the VCM is being pushed by an outside force).
controllerPlusDisturbance = parallel(controllerSys, straightThroughSys, [], [], 1, 1);

% Put VCM and controller (plus disturbance) in series, to form the open-loop gain.
vcmOpenLoopSys = series(controllerPlusDisturbance, vcmPlantSys);

% Put in the feedback loop, to create the entire system (without any "feedforward" correction)
%
```

```
%   **** VCM SYSTEM LOOP DIAGRAM ****
%
%   DIST        ----------------------
%                                    |
%                                    |
%                                    |
%                   ----------       |      ----------
%                  |          |      |     |          |
%   TARGET  --->0--->|  CTLR    |--0-->|  PLANT   |-------------> PES
%               ^   |          |      |     |          |
%               |    ----------             ----------
%               |    |                                         |
%               |    |                                         |
%               ------------------------------------------------
%
```

% For this system, our TARGET position is always zero. We will inject
% RRO (and NRRO, if appropriate) through the DIST input. That way, it
% is as if some outside entity is pushing the head around.
%
% For servoSys, the first input is the TARGET input,
% and the second input is the DIST input.
%
% The system has three states:
%
% State #1 is the VCM angular position (in radians)
% State #2 is the VCM angular velocity (in radians per second)
% State #3 is an internal controller state
%
% The system has two inputs:
%
% The first input is the TARGET
% The second input is the DIST
%
% The system output is the head position (in tracks).
%
vcmSys = feedback(vcmOpenLoopSys, straightThroughSys, 1, 1);

% Now, construct a similar loop for spindle-speed control (including
% the fact that the spindle is affected by the same rotational
% disturbances that affect the actuator). Because we only care
% about spindle speed (not position), the plant is first-order
% (where the actuator plant is second-order, to account for both
% speed and position).
%
% For this system, though, we'll also allow noise in the spin-speed measurement.

%
%   ** SPIN SYSTEM LOOP DIAGRAM **

```
%
%
%  NOISE    ----------------------------------------
%                                                  |
%                                                  |
%                                                  |
%  DIST     ----------------------                 |
%                               |                  |
%                               |                  |
%                               |                  |
%                   ----------  |   ----------     |
%                  |          | |  |          |    |
%  TARGET  --->0--->|   CTLR   |--0-->|  PLANT   |----0--------> SPIN-SPEED
%           ^      |          |    |          |
%           |       ----------      ----------
%           |
%           |
%            ------------------------------------------------
%
% The system has one state.
%
% That state is the SPIN-SPEED
%
% The system has three inputs:
%
% The first input is the TARGET
% The second input is the DIST
% The third input is the NOISE
%
% The system output is the spin-speed (in radians per second)
%
kSpin = 10;   % This results in a very low BW spin-control loop (below 2 Hz crossover)
spindleA_continuous = [0]; spindleB_continuous = [1]; spindleC_continuous = [1]; spindleD_continuous = [0];
spinPlantSys_continuous = ss(spindleA_continuous, spindleB_continuous, spindleC_continuous,
spindleD_continuous);
spinPlantSys = c2d(spinPlantSys_continuous, sampleTime);
spinControlNum = [kSpin]; spinControlDen = [1];
spinControlSys = tf(spinControlNum, spinControlDen, sampleTime);
spinControlPlusDisturbance = parallel(spinControlSys, straightThroughSys, [], [], 1, 1);
spinOpenLoopSysWithoutNoise = series(spinControlPlusDisturbance, spinPlantSys);
spinOpenLoopSys = parallel(spinOpenLoopSysWithoutNoise, straightThroughSys, [], [], 1, 1);
spinSys = feedback(spinOpenLoopSys, straightThroughSys, 1, 1);

% Construct a frequency-vector that goes up to (nearly) the Nyquist frequency.
% For now, use frequency increments of 0.001 times the VCM servo Nyquist frequency.
omegaVector = 2*pi*(1/(2*sampleTime))*[[0.0001:0.0001:0.0009] [0.001:0.001:0.99]];

% Get the frequency-response of the loop.
[vcmMag, vcmPhase, w]  = bode(vcmOpenLoopSys, omegaVector);
[spinMag, spinPhase, w] = bode(spinOpenLoopSys, omegaVector);

% I do not know an elegant way to get a single error-transfer-function from
% the (three-dimensional) set of all transfer-functions determined above.
% Do it using a for-loop.
clear target_TF_mag target_TF_phase dist_TF_mag dist_TF_phase
clear spinTarget_TF_mag spinTarget_TF_phase spinDist_TF_mag spinDist_TF_phase
for i=[1:size(vcmMag,3)]
    target_TF_mag(i)    = vcmMag(1,1,i);
```

```
target_TF_phase(i)    = vcmPhase(1,1,i)*pi/180;
dist_TF_mag(i)        = vcmMag(1,2,i);
dist_TF_phase(i)      = vcmPhase(1,2,i)*pi/180;

spinTarget_TF_mag(i)   = spinMag(1,1,i);
spinTarget_TF_phase(i) = spinPhase(1,1,i)*pi/180;
spinDist_TF_mag(i)     = spinMag(1,2,i);
spinDist_TF_phase      = spinPhase(1,2,i)*pi/180;
end plotNum = 0;

plotNum = plotNum+1; plot(plotNum);
freqVector = omegaVector / (2*pi);
semilogx(freqVector, 20*log10(target_TF_mag), 'b', freqVector, (target_TF_phase*180/pi)+180, 'r'); gz
title('Open-loop gain and phase-margin for VCM control loop');
xlabel('Frequency (Hz)');
ylabel('Open-loop gain (dB) and Phase-Margin (Degrees-Dashed Line)');

plotNum = plotNum+1; plot(plotNum);
semilogx(freqVector, 20*log10(spinTarget_TF_mag), 'b', freqVector, (spinTarget_TF_phase*180/pi)+180, 'r'); gz
title('Open-loop gain and phase-margin for SPIN control loop');
xlabel('Frequency (Hz)');
ylabel('Open-loop gain (dB) and Phase-Margin (Degrees-Dashed Line)');

% Our target input to the VCM system will be all zeros.
% Our disturbance will have both positive and negative (extended) pulses.
%
% First, construct the input.
%
% The units of the disturbance are rad/sec^2 (angular acceleration).
disturbanceCycleTime    = 1 / disturbanceFreqHz;
disturbanceCycleSamples = round(disturbanceCycleTime / sampleTime);
vcmU1                   = zeros(samplesToSimulate, 1);
vcmU2                   = zeros(samplesToSimulate, 1);
switch (disturbanceType)
   case {'sinewave', 'SINEWAVE', 'sine', 'SINE', 'sin', 'SIN'}
       vcmU2(20+1:20+disturbanceCycleSamples) = disturbanceAmplitude * sin(2*pi*[1:disturbanceCycleSamples]/disturbanceCycleSamples);
   case {'pulse', 'PULSE'}
       vcmU2(20+1:20+disturbanceCycleSamples) = disturbanceAmplitude * ones(size([1:disturbanceCycleSamples]));
   otherwise
       error(fprintf('vibRejectionDemo: Unrecognized disturbanceType, "%s"\n', disturbanceType));
   end
vcmInput               = [vcmU1 vcmU2];

spinTargetSpeed = 2*pi*spinSpeedHz;
spinInitState   = spinTargetSpeed;
spinU1          = spinTargetSpeed * ones(samplesToSimulate, 1);
spinU2          = vcmU2;

% Put some "white noise" into the spindle speed output. This is added to simulate
% effects of written-in timing-runout, as well as electrical noise and race-conditions
% in the SAM-to-SAM timing measurement.
spinSpeedNoise = 0*0.05*(mean(rand(size(vcmU2,1),12)')'-0.5) + 0.00;
spinU3         = spinSpeedNoise;
```

Attorney Docket No.: PANA-01064US6         Express Mail No.: EV 452818785 US
taw/pana/1064us6/1064us2.001

```
spinInput    = [spinU1 spinU2 spinU3];

% Simulate the systems.
spinSpeed = lsim(spinSys, spinInput, timeVector, spinInitState);
vcmPos    = lsim(vcmSys, vcmInput);

% Show how the spin-speed is affected by the disturbance.
plotNum = plotNum+1; plot(plotNum);
plot(timeVector, spinU2/200); gz; hold on;
plot(timeVector, (spinSpeed-spinTargetSpeed), 'r'); hold off; gz
title('Disturbance/200 (dashed line;rad/sec^2) and resulting spin-speed error (rad/sec)');
xlabel('Time (sec)');

wedgeToWedgeTimeSec = (1/wedgesPerRev) ./ (spinSpeed/(2*pi));
wedgeToWedgeClocks = wedgeToWedgeTimeSec * servoClockFrequency;
plotNum = plotNum+1; plot(plotNum);
plot(timeVector, wedgeToWedgeClocks, 'b*-', timeVector, round(wedgeToWedgeClocks), 'k'); gz;
title('wedgeToWedgeClocks');
xlabel('Time (sec)'); ylabel('wedgeToWedgeClocks (unitless clock-counts)');

% Now, show how the VCM position is affected.
% (without the benefit of any feedforward, based upon spin-speed measurements).
plotNum = plotNum+1; plot(plotNum);
plot(timeVector, vcmU2/200); gz; hold on;
plot(timeVector, vcmPos, 'r'); hold off; gz
title('Disturbance/200 (dashed line; radians/sec^2) and resulting PES (tracks)');
xlabel('Time (sec)');

kSpinFF = -1;

% The disturbance is estimated by digitally "differentiating" the time between wedges.
% estSpinSpeedNoQuantization (units of rad/sec) is what we would get if we had no quantization on the clock.
% estSpinSpeedWithQuantization (also units of rad/sec) is what we would get with a quantized clock.
estSpinSpeedNoQuantization   = 2*pi ./ (wedgesPerRev*wedgeToWedgeClocks/servoClockFrequency);
estSpinSpeedWithQuantization = 2*pi ./ (wedgesPerRev*round(wedgeToWedgeClocks)/servoClockFrequency);

% difference and scale to get estimatedDisturbance (units of rad/(sec^2)).
estimatedDisturbance = [0; diff(estSpinSpeedNoQuantization)] * (1/sampleTime);
vcmInputWithFF(:,1) = vcmInput(:,1);
vcmInputWithFF(:,2) = vcmInput(:,2) + kSpinFF*estimatedDisturbance;
vcmPosWithFF = lsim(vcmSys, vcmInputWithFF);

% We will now simulate the system's behavior with a discretized spin-speed
% measurement. We will offset the speed, discretize it, and then remove
% the offset. By offsetting the noise from zero-mean, we can simulate the
% situation in which our wedge-to-wedge time is nearly an integer number
% of clock-cycles, and so the number of clock-cycles counted can switch
% back and forth by 1 count from rev to rev.
spinSpeedNoiseOffset = 0.0;
discretizedEstDist = [0; diff(estSpinSpeedWithQuantization)] * (1/sampleTime);
% Filter the estimated disturbance (to take some of the "edge" off of the discretized signal).
alpha=0.50; num=[alpha 0]; den=[1 -(1-alpha)]; estDistQuantizedAndFiltered=filter(num,den,discretizedEstDist);
vcmInputWithDiscretizedFF(:,1) = vcmInput(:,1);
vcmInputWithDiscretizedFF(:,2) = vcmInput(:,2) + kSpinFF*estDistQuantizedAndFiltered;
vcmPosWithDiscretizedFF = lsim(vcmSys, vcmInputWithDiscretizedFF);
``` plotNum = plotNum+1; plot(plotNum);
plot(timeVector, vcmPos, 'b', timeVector, vcmPosWithFF, 'k', timeVector, vcmPosWithDiscretizedFF, 'r'); gz
title('PES without FF (dashed line), with perfect FF (medium line), and with filtered/discretized FF (fine line)')
xlabel('Time (sec)'); ylabel('PES (tracks)');

plotNum = plotNum+1; plot(plotNum);
plot(timeVector, estimatedDisturbance, 'k', timeVector, discretizedEstDist, 'r', timeVector, estDistQuantizedAndFiltered, 'b'); gz
title('Est dist, discretized spin speed (fine line), filtered disc speed (clear to 0.02 sec, dashed after 0.02 sec)');
xlabel('Time (sec)'); ylabel('Estimated rotational disturbance (rad/sec^2)');

APPENDIX B
RUN OF MATLAB® MODEL FROM APPENDIX A
Plot No. 1
Open-loop gain and phase-margin for VCM control loop
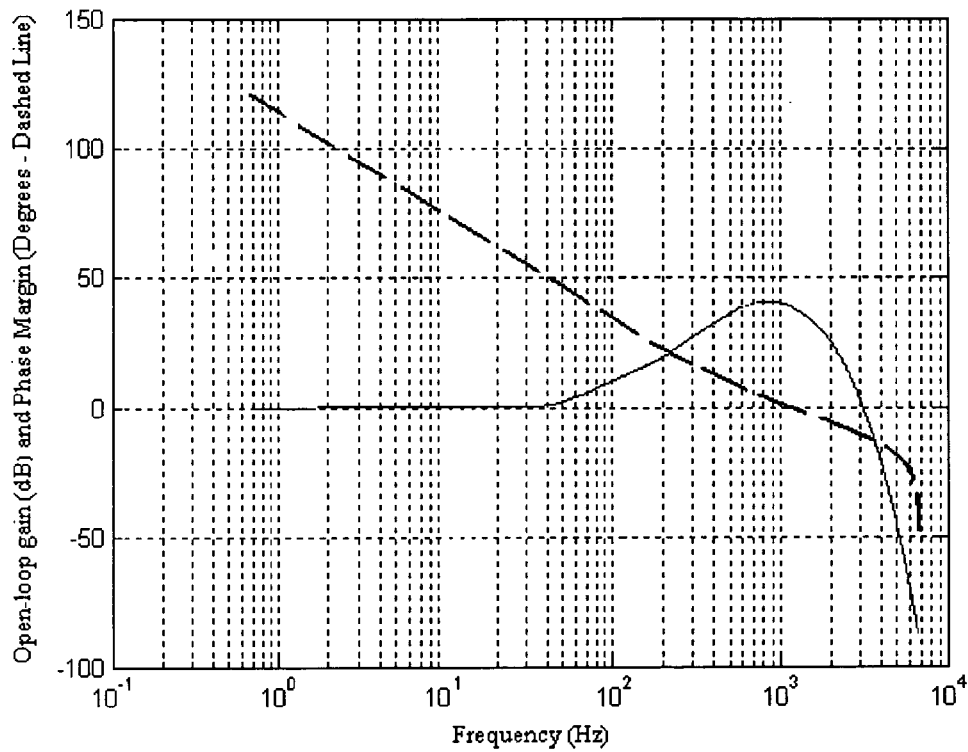

Plot No. 2
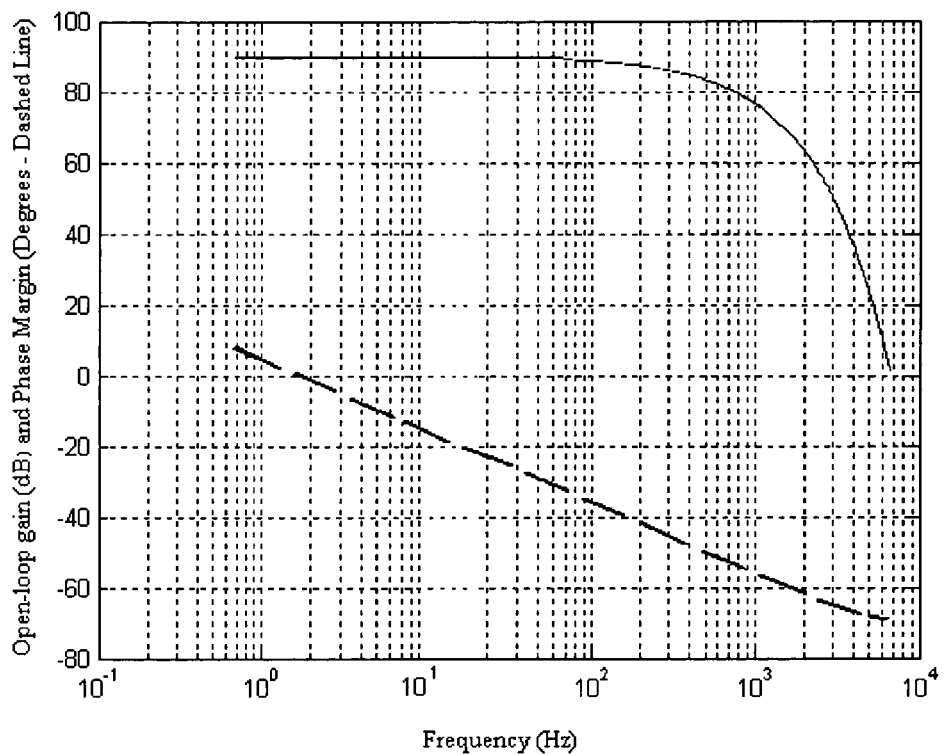

Plot No. 3
Disturbance/200 (dashed line; rad/sec$^2$) and resulting spin-speed error (rad/sec)
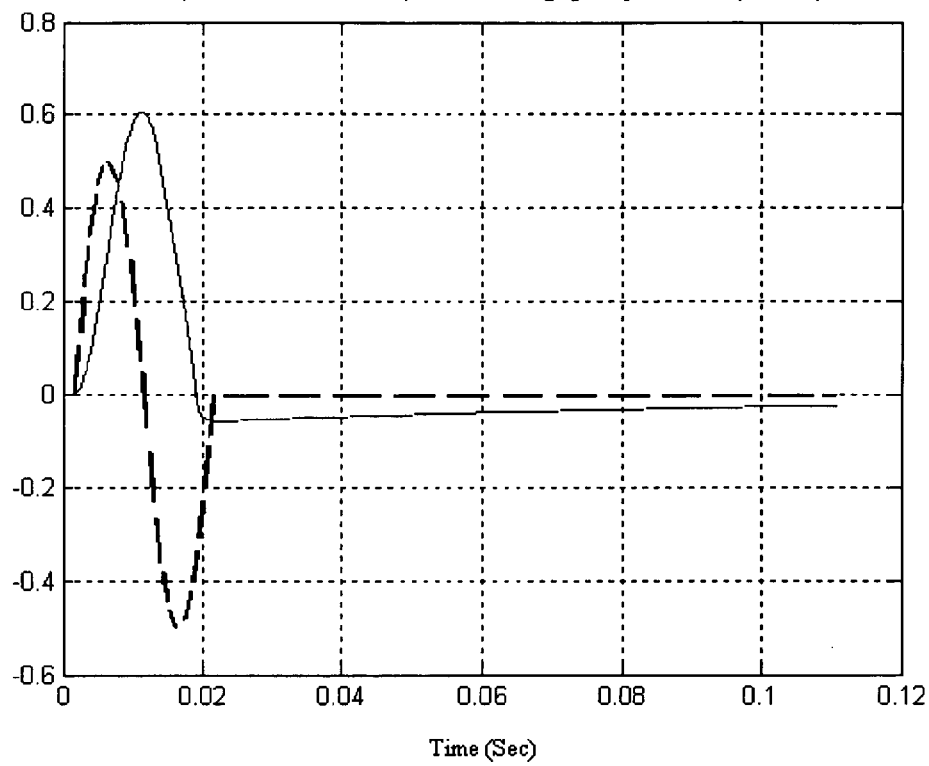
Time (Sec)

Plot No. 4
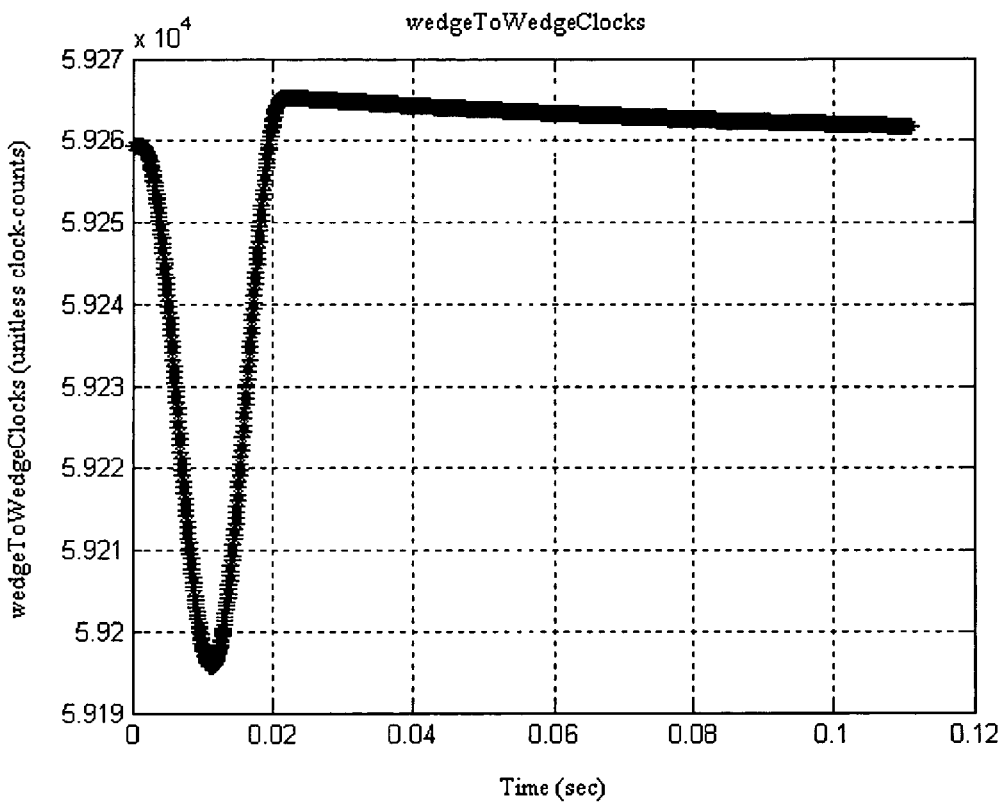

Plot No. 5
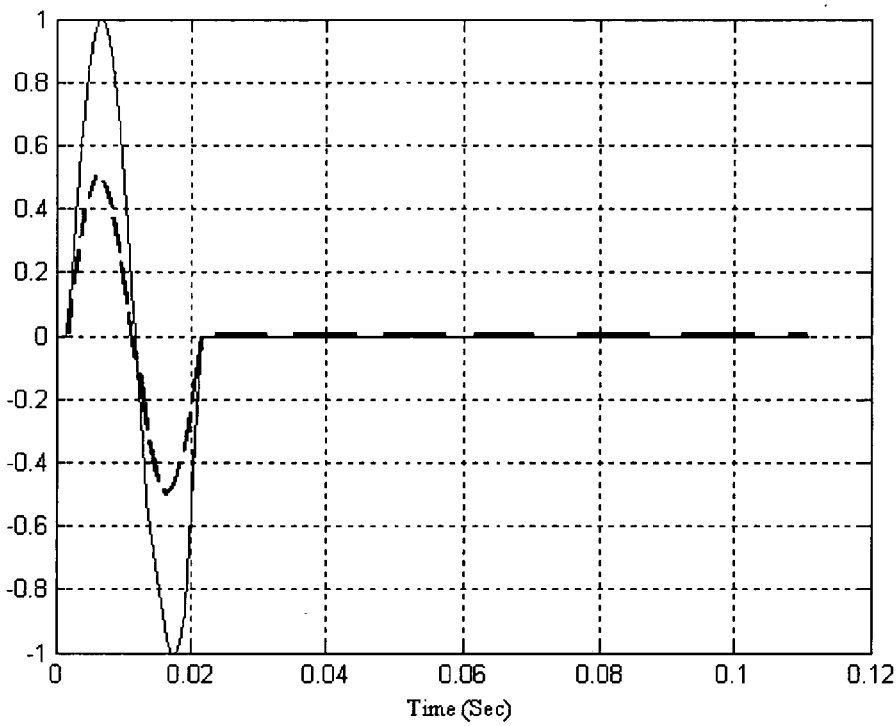
Disturbance/200 (radians/sec$^2$; dashed line) and resulting PES (tracks)

Plot No. 6
PES without FF (dashed line), with perfect FF (medium line), and with filtered/discretized FF (fine line)
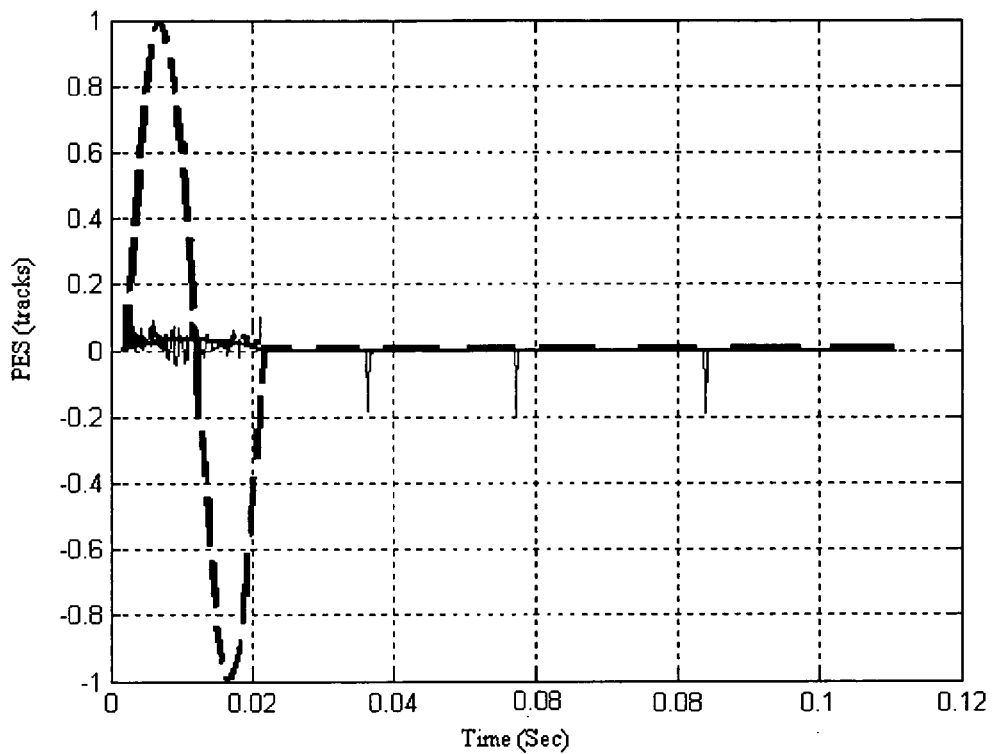

Plot No. 7
Est dist, discretized spin speed (fine line), filtered disc speed (clear to 0.02sec; dashed after 0.02 sec)
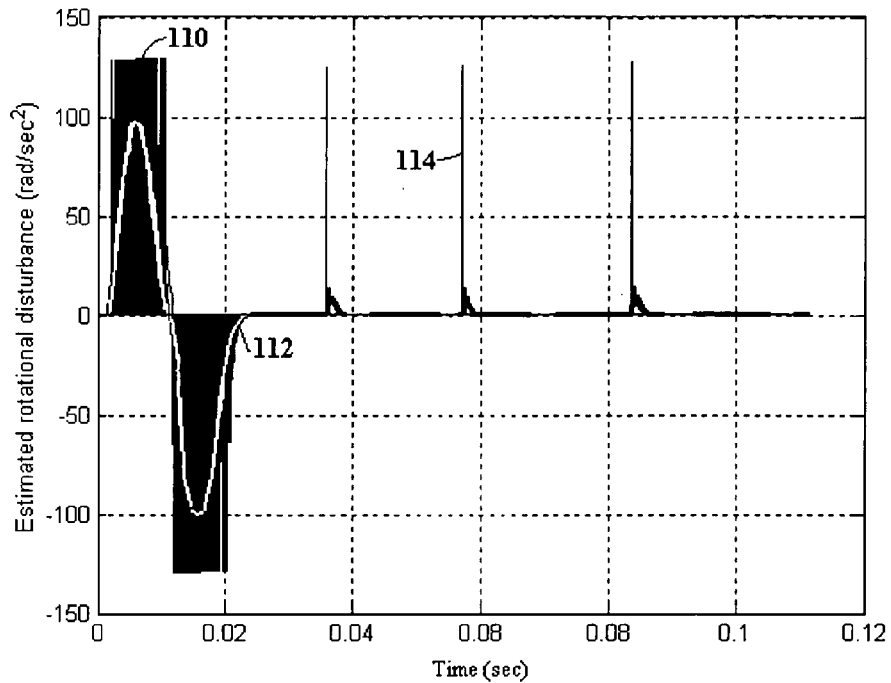

What is claimed is:

1. A method used by a servo system for a hard disk drive to control the track alignment of a transducer head relative to a desired tracking location comprising:

measuring track alignment using servo data position error signals (PES) read from a rotatable disk by the read head;

measuring a feed forward signal indicative of external disturbances applied to the hard disk drive; and determining track alignment using the PES measurement and the feed forward signal measurement, the feed forward signal measurement being used to determine corrections only when the servo system determines use of the feed forward signal reduces track alignment error, wherein the servo system determines that use of the feed forward signal will likely reduce the track alignment error when a threshold is exceeded, the threshold being set with a magnitude so that moving the read/write head to make correct track alignment corrections after the disturbance occurs would take less time than use of the PES alone.

2. The method of claim 1, wherein the feed forward signal comprises a spindle motor speed indication determined from a frequency of servo markers passing the transducer head.

3. The method of claim 1, wherein the feed forward signal comprises a signal from an accelerometer.

4. The method of claim 1, wherein the feed forward signal comprises a back electro-motive force (emf) signal from a VCM.

5. The method of claim 1, wherein the feed forward signal comprises a back electro-motive force (emf) signal from a spindle motor.

6. The method of claim 1, wherein the servo system determines that use of the feed forward signal will reduce the track alignment error when a threshold is exceeded, the threshold being determined from a computer model enabling comparison of a predicted PBS amount with and without use of the feed forward signal.

7. The method of claim 1, wherein when the feed forward measurement is used, track alignment correction is provided using the feed forward signal without the PES signal.

8. The method of claim 1, wherein when the feed forward measurement is used, track alignment correction is provided using both the feed forward signal and the PES signal.

9. A method used by a servo system for a hard disk drive to control the track alignment of a read head relative to a desired tracking location comprising:

measuring track alignment using servo data position error signals (PES) read from a rotatable disk by the read head;

measuring a feed forward signal indicative of external disturbances applied to the hard disk drive; and determining the track alignment using the PES measurement and the feed forward signal measurement, the feed forward signal measurement being used to determine the track alignment only when a threshold value related to the disturbance is detected, wherein the threshold value is provided with hysteresis so that the threshold has a first value when use is made of the feed forward measurement and second value when switching back to not using the feed forward measurement.

10. The method of claim 9, wherein the threshold value comprises a PBS signal magnitude.

11. The method of claim 9, wherein the threshold value comprises a disturbance magnitude.

12. A method used by a servo system for a hard disk drive to control the track alignment of a transducer head relative to a desired tracking location comprising:

measuring track alignment using servo data position error signals (PES) read from the rotatable disk by the transducer head;

measuring a feed forward signal indicative of a disturbance applied to the hard disk drive; and determining track alignment corrections using the PES measurement and the feed forward signal measurement, the feed forward signal measurement being used to control corrections only when there is a determination that use of the feed forward signal measurement reduces track alignment error, wherein when the feed forward signal measurement is used, track alignment correction is provided using the feed forward signal without the PES signal.

13. In a method used by a servo system for a hard disk drive that controls track alignment of a transducer head relative to a desired track using a first measurement made from servo data position error signals (PBS) read from a rotatable disk by the transducer, the improvement comprising:

using a second measurement made from a feed forward signal indicative of a disturbance applied to the hard disk drive to control the track alignment only when there is a determination that use of the second measurement reduces track alignment error, wherein the determination is made that use of the feed forward signal will likely reduce the track alignment error when a threshold is exceeded, the threshold being set with a magnitude so that moving the read/write head to make correct track alignment corrections after the disturbance occurs would take less time than use of the PES alone.

* * * * *